US011461011B2

(12) United States Patent
Murphy et al.

(10) Patent No.: US 11,461,011 B2
(45) Date of Patent: *Oct. 4, 2022

(54) EXTENDED LINE WIDTH MEMORY-SIDE CACHE SYSTEMS AND METHODS

(71) Applicant: Micron Technology, Inc., Boise, ID (US)

(72) Inventors: Richard C. Murphy, Boise, ID (US); Anton Korzh, Boise, ID (US); Stephen S. Pawlowski, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/084,340

(22) Filed: Oct. 29, 2020

(65) Prior Publication Data
US 2021/0048951 A1 Feb. 18, 2021

Related U.S. Application Data

(62) Division of application No. 16/884,937, filed on May 27, 2020, now Pat. No. 10,831,377, which is a
(Continued)

(51) Int. Cl.
*G06F 3/06* (2006.01)
*G06F 12/0815* (2016.01)
*G06F 12/0811* (2016.01)

(52) U.S. Cl.
CPC .......... *G06F 3/0611* (2013.01); *G06F 3/0634* (2013.01); *G06F 3/0656* (2013.01);
(Continued)

(58) Field of Classification Search
CPC ............. G06F 12/0811; G06F 12/0815; G06F 12/0804; G06F 12/0868; G06F 2212/1024; G06F 2212/1032; G06F 2212/601
See application file for complete search history.

(56) References Cited

U.S. PATENT DOCUMENTS 5,471,591 A * 11/1995 Edmondson .......... G06F 9/3838
711/E12.024
7,685,372 B1 * 3/2010 Chen ................... G06F 12/1063
711/141
(Continued)

FOREIGN PATENT DOCUMENTS

CN 101044464 A 9/2007
CN 101206912 A 6/2008

OTHER PUBLICATIONS

Stephen Somogyi, Thomas F. Wenisch, Anastassia Ailamaki, Babak Falsafi, and Andreas Moshovos. 2006. Spatial Memory Streaming. SIGARCH Comput. Archit. News 34, 2 (May 2006), 252-263. (Year: 2006).*

(Continued)

*Primary Examiner* — Ramon A. Mercado
(74) *Attorney, Agent, or Firm* — Fletcher Yoder, P.C.

(57) ABSTRACT

The present disclosure techniques for implementing an apparatus, which includes processing circuitry that performs an operation based a target data block, a processor-side cache that implements a first cache line, memory-side cache that implements a second cache line having line width greater than the first cache line, and a memory array. The apparatus includes one or more memory controllers that, when the target data block results in a cache miss, determine a row address that identifies a memory cell row as storing the target data block, instruct the memory array to successively output multiple data blocks from the memory cell row to enable the memory-side cache to store each of the multiple of data blocks in the second cache line, and instruct the memory-side cache to output the target data block to a coherency bus to enable the processing circuitry to perform the operation based on the target data block.

20 Claims, 6 Drawing Sheets

Related U.S. Application Data division of application No. 16/053,584, filed on Aug. 2, 2018, now Pat. No. 10,691,347.

(60) Provisional application No. 62/682,050, filed on Jun. 7, 2018.

(52) U.S. Cl.
CPC ........ G06F 3/0658 (2013.01); G06F 12/0811 (2013.01); G06F 12/0815 (2013.01); *G06F 2212/1024* (2013.01); *G06F 2212/1032* (2013.01); *G06F 2212/601* (2013.01)

(56) References Cited

U.S. PATENT DOCUMENTS

| | | | |
|---|---|---|---|
| 10,540,286 B2 | 1/2020 | Milojicic et al. | |
| 2003/0200408 A1 | 10/2003 | Mekhiel | |
| 2006/0095679 A1 | 5/2006 | Edirisooriya | |
| 2008/0151677 A1 | 6/2008 | Sato et al. | |
| 2008/0181027 A1* | 7/2008 | Sato | G11C 11/4087 365/230.01 |
| 2008/0256303 A1 | 10/2008 | Croxford et al. | |
| 2009/0177842 A1 | 7/2009 | Kulkarni | |
| 2010/0036997 A1* | 2/2010 | Brewer | G06F 12/0811 711/E12.082 |
| 2012/0137075 A1* | 5/2012 | Vorbach | G06F 9/526 711/E12.024 |
| 2012/0198162 A1* | 8/2012 | Chachad | G06F 7/483 711/122 |
| 2013/0111136 A1* | 5/2013 | Bell, Jr. | G06F 12/08 711/E12.017 |
| 2013/0326145 A1* | 12/2013 | Shalev | G06F 13/38 711/122 |
| 2014/0304475 A1* | 10/2014 | Ramanujan | G06F 11/07 711/135 |
| 2015/0089155 A1 | 3/2015 | Busaba et al. | |
| 2015/0339239 A1* | 11/2015 | Heddes | G06F 12/1081 710/308 |
| 2016/0335177 A1 | 11/2016 | Huang | |
| 2017/0091099 A1* | 3/2017 | Greenfield | G06F 12/0811 |
| 2017/0110207 A1 | 4/2017 | Jung et al. | |
| 2017/0168957 A1* | 6/2017 | Christidis | G06F 12/084 |
| 2020/0285400 A1 | 9/2020 | Murphy et al. | |

OTHER PUBLICATIONS

K. Inoue, K. Kai and K. Murakami, "Dynamically variable line-size cache exploiting high on-chip memory bandwidth of merged DRAM/logic LSIs," Proceedings Fifth International Symposium on High-Performance Computer Architecture, 1999, pp. 218-222. (Year: 1999).*

Chinese Office Action; Chinese Application No. 201811014792.2; dated Jul. 6, 2021.

Richard Murphy et al., The Implications of Working Set Analysis on Supercomputing Memory Hierarchy Design, University of Notre Dame, Jun. 2005.

Jason T. Zawodny et al., Cache-in-Memory, Dept. of Computer Science & Engineering, Univ. of Notre Dame, Jan. 2001.

* cited by examiner

FIG. 1
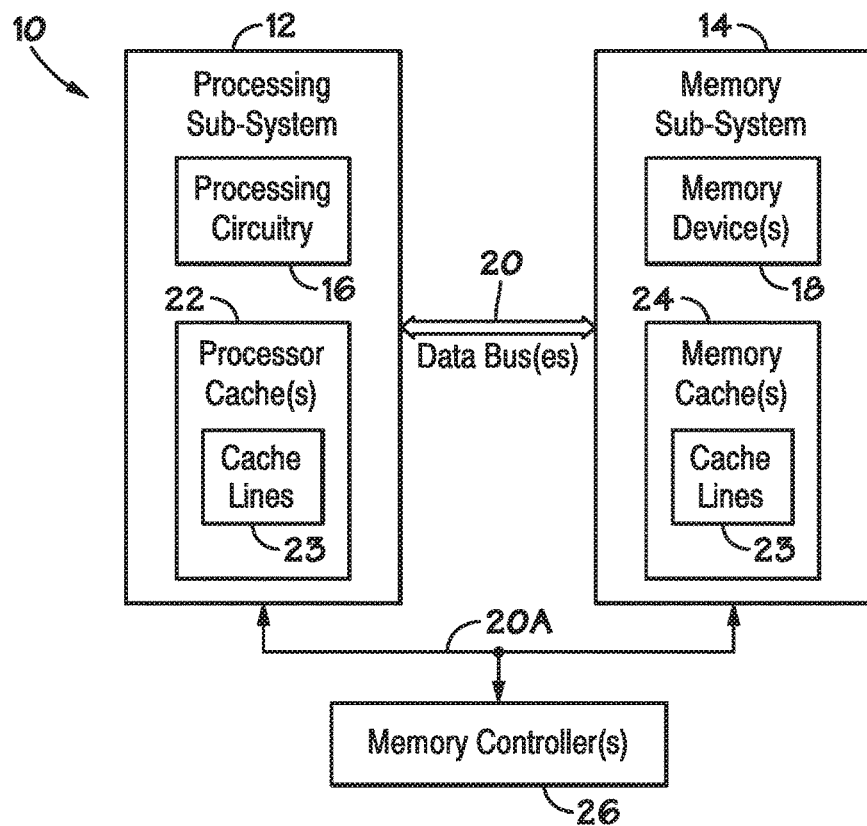
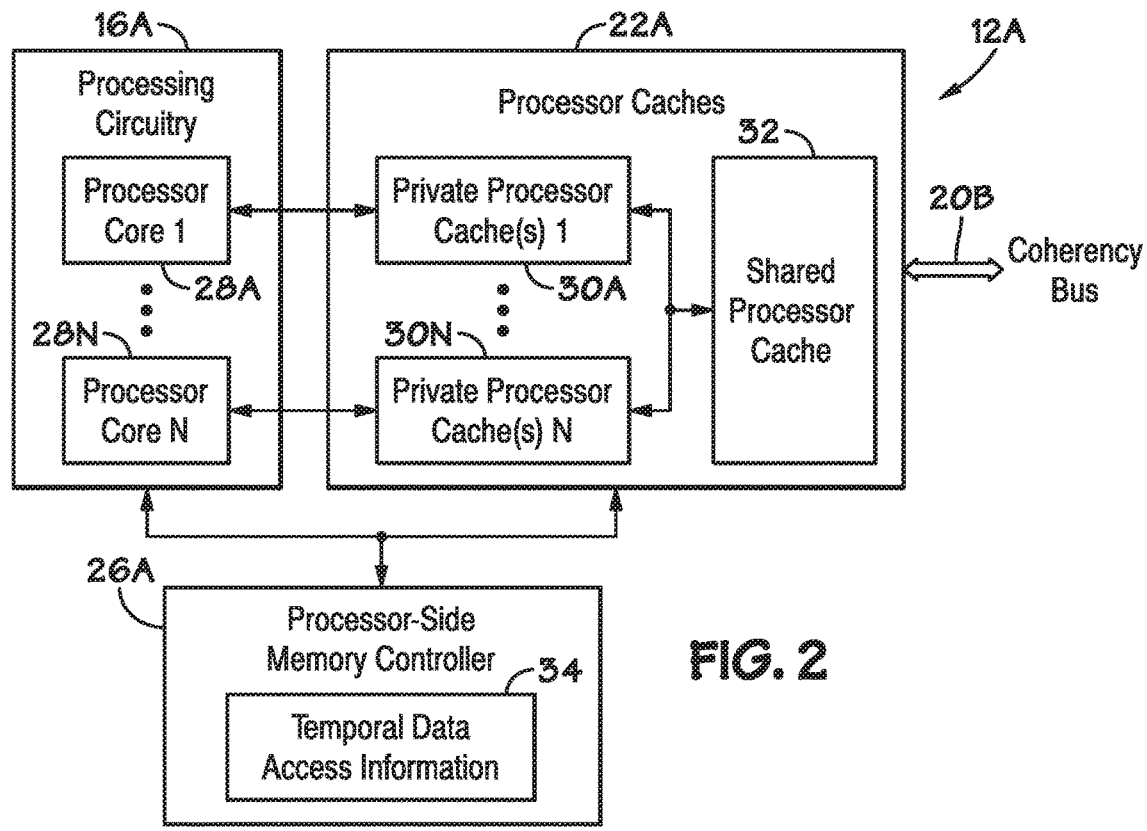
FIG. 2

EXTENDED LINE WIDTH MEMORY-SIDE CACHE SYSTEMS AND METHODS

CROSS-REFERENCE TO RELATED APPLICATION

This application is a divisional of U.S. patent application Ser. No. 16/884,937, entitled "EXTENDED LINE WIDTH MEMORY-SIDE CACHE SYSTEMS AND METHODS," filed May 27, 2020, which is a divisional of U.S. Non-Provisional application Ser. No. 16/053,584, entitled "EXTENDED LINE WIDTH MEMORY-SIDE CACHE SYSTEMS AND METHODS," filed Aug. 2, 2018, now U.S. Pat. No. 10,691,347 which issued on Jun. 23, 2020, which claims priority to and the benefit of U.S. Provisional Patent Application Ser. No. 62/682,050, entitled "DYNAMIC LINE WIDTH MEMORY CACHE SYSTEMS AND METHODS," filed Jun. 7, 2018, all of which are incorporated herein by reference in their entireties.

BACKGROUND

The present disclosure generally relates to memory devices and, more particularly, to caches implemented in one or more memory devices of a memory sub-system.

Generally, a computing system includes a processing sub-system and a memory sub-system, which may store data accessible by processing circuitry of the processing sub-system. For example, to perform an operation, the processing circuitry may execute corresponding instructions retrieved from a memory device of the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which:

FIG. 1 is a block diagram of a computing system that includes a processing sub-system and a memory sub-system, in accordance with an embodiment of the present disclosure;

FIG. 2 is a block diagram of an example of the processing sub-system of FIG. 1 with a processor-side memory controller, in accordance with an embodiment of the present disclosure;

DETAILED DESCRIPTION

Figures 3, 4:
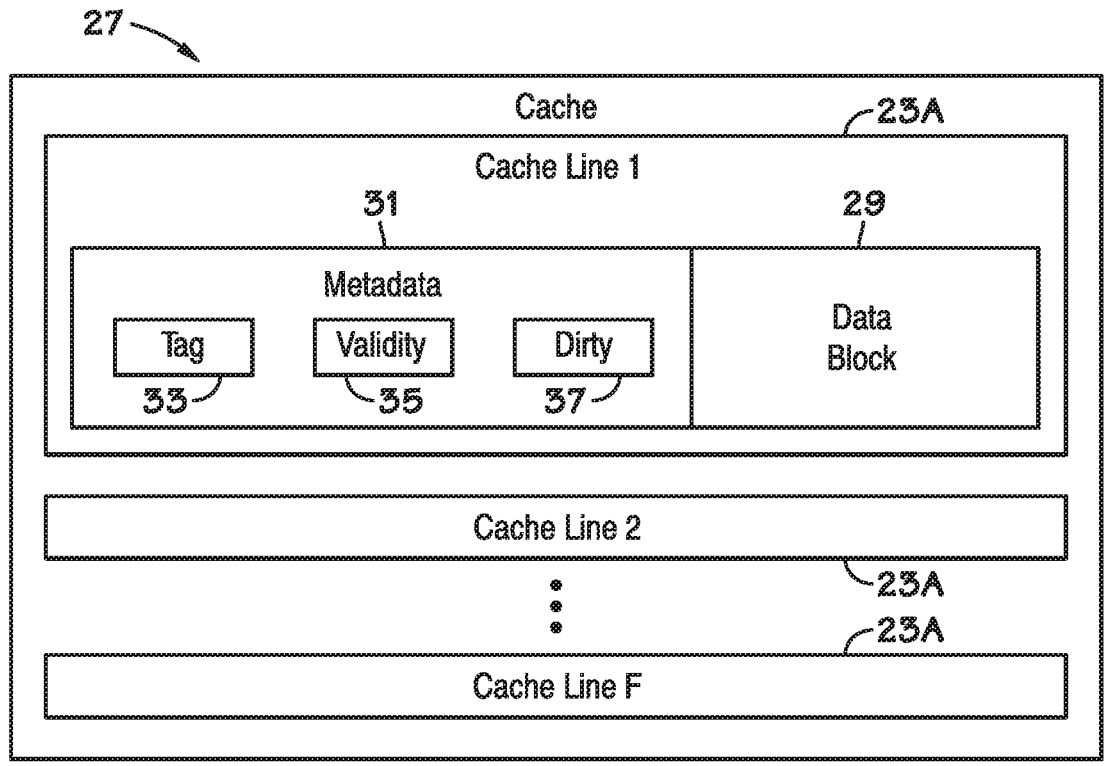
FIG. 3 is a diagrammatic representation of an example of a first cache, in accordance with an embodiment of the present disclosure
FIG. 4 is a diagrammatic representation of example temporal data access information used by the processor-side memory controller of FIG. 2, in accordance with an embodiment of the present disclosure.

The present disclosure provides techniques that facilitate improving operational efficiency of computing systems, for example, by mitigating architectural features that may otherwise limit operational efficiency. Generally, a processing sub-system of a computing system includes processing circuitry, for example, implemented using one or more processors and/or one or more processor cores. Additionally, a memory sub-system of a computing system may include one or more memory devices (e.g., chips or integrated circuits), for example, implemented on one or more memory modules, such as a dual in-line memory module (DIMM).

During operation of the computing system, the processing circuitry may perform various operations by executing corresponding instructions, for example, to determine output data by performing an operation on input data. In some instances, data accessible to the processing circuitry may be stored in the memory devices of the memory sub-system. For example, the memory devices may store the data input to the operation, the data output (e.g., resulting) from the operation, data indicating the executable instructions, or any combination thereof.

Additionally, in some instances, the memory cells implemented in the memory devices may be organized into one or more arrays, for example, each corresponding with a memory channel. To implement a memory array, memory cells may be coupled to word lines formed in a first (e.g., horizontal) direction and to bit lines formed in a second (e.g., vertical) direction. For example, a row of the memory array may include the memory cells coupled to one word line. Additionally, in some embodiments, a column of the memory array may include the memory cells coupled to multiple bit lines.

In other words, the memory cells (e.g., storage location) connected at a row address and column address pairing may store a data block with bit-depth (e.g., size) dependent on the number of bit lines included in the column identified by the column address. For example, when each column includes 1024 bit-lines, the memory cells implemented at each row address and column address pairing may store a 64 byte (e.g., 1024 bit) data block. Additionally, when the memory array includes sixteen columns, each row of the memory array may store sixteen data blocks.

Thus, to retrieve a target data block from the memory array, the memory sub-system may determine a row address and column address pairing that indicates the storage location of the target data block in the memory array. Based on the row address, the memory sub-system may activate a row in the memory array in which the target data is stored, for example, via an activation signal supplied to a word line of the row. Additionally, the memory sub-system may output (e.g., read) the target data block from the memory cells in the activated row that are included in a column identified by the column addresses via the bit lines of the column, for example, in response to a column select signal.

However, data communication between different computing sub-systems is generally slower than data communication within a computing sub-system, for example, due to timing of the different computing sub-systems, the data buses coupled between the different sub-systems being shared with other computing sub-systems, and/or communication distance between the different sub-systems. In other words, data communication within (e.g., internal to) the processing sub-system may be faster than data communication between the processing sub-system and the memory sub-system. Thus, to facilitate improving operational efficiency, one or more caches may be implemented in the processing sub-system.

For example, the processing sub-system may be implemented with one or more processor-side caches, such as an L1 cache, an L2 cache, and/or an L3 cache integrated with the processing circuitry. Since a processor-side cache may provide a target data block to the processing circuitry, in some instances, the processor-side cache may utilize a cache line width (e.g., size) based at least in part on the bit-depth of data blocks expected to be targeted by the processing circuitry. For example, when the processing circuitry is expected to target 64 byte data blocks, the processor-side cache may be implemented using 64 byte cache lines.

In any case, data communication with a cache is generally faster than data communication with the memory array (e.g., DRAM), for example, due to the cache being implemented with memory of a faster type, such as SRAM. Thus, before retrieving a target data block from the memory array, the computing system may attempt to retrieve the target data block from the caches implemented between the processing circuitry and the memory array. In other words, when currently stored in one or more of the caches, the computing system may provide the cache line that includes an instances (e.g., copy) of the target data block to the processing circuitry, for example, instead of from a memory device that also stores the target data block. Due to the faster data communication provided by the caches compared to the memory array, at least in some instances, providing the target data block from the caches may facilitate improving (e.g., reducing) data retrieval latency and, thus, operational efficiency of the computing system.

On the other hand, after determining that the target data block is not currently stored in any of the caches, the computing system may retrieve the target data block from a memory array implemented in its memory sub-system. Moreover, in some instances, the computing system may store a copy of the target data block in one or more the caches after retrieval from the memory array, for example, to facilitate reducing data retrieval latency if the target data block is again requested. Thus, at least in some instance, a cache miss may actually result in slower (e.g., higher) data retrieval latency compared to directly retrieving the target data block from the memory array.

In other words, the effect on operational efficiency resulting from implementing the caches may be largely dependent on whether a target data block is currently stored in one or more of the caches. Moreover, storage (e.g., memory) capacity of a cache is generally smaller than the storage capacity of the one or more memory arrays implemented in the memory sub-system. In fact, total or combined storage capacity of the caches is often still smaller than the storage capacity of a memory array, for example, to facilitate balancing differing implementation costs, such as component count and/or physical footprint, associated with the memory (e.g., SRAM) used to implement in the caches and the memory (e.g., DRAM) used to implement the memory array.

As such, to facilitate improving operational efficiency, the computing system may predict a data access pattern expected to subsequently occur and control data storage in its caches accordingly, for example, via one or more memory controllers. In other words, the computing system may determine the expected data access pattern by predicting what data its processing circuitry will subsequently target (e.g., request) and/or when the processing circuitry will subsequently target the data.

Although seemingly random, data access patterns of processing circuitry are often somewhat cyclical. As such, in some instances, the computing system may predict the data access pattern expected to occur over an upcoming control horizon (e.g., time period or one or more clock cycles) based at least in part on previous data access by the processing circuitry. For example, a processor-side memory controller may predict whether a data block will be targeted in the upcoming control horizon based at least in part on temporal access information, which indicates when the data block was most recently targeted by the processing circuitry and/or the number of times the data block has been targeted by the processing circuitry. Additionally, the processor-side memory controller may control data storage in a processor-side cache such that data blocks expected to be targeted during the upcoming control horizon are stored in the processor-side cache before actually targeted by the processing circuitry. However, at least in some instances, other factors may be indicative of data access pattern and, thus, affect the operational efficiency of the computing system resulting from implementing caches between the processing circuitry and the memory array.

Accordingly, to facilitate improving operational efficiency of a computing system, the present disclosure provides techniques for implementing and/or controlling data storage in one or more caches based at least in part on factors, such temporal factors and/or spatial factors, indicative of data access pattern, for example, to facilitate reducing likelihood of cache misses occurring and, thus, operational efficiency of the computing system. In particular, at least in some instances, storage location (e.g., row address and column address pairing) of data blocks in a memory array may be indicative data access pattern. For example, access to a first data block may be indicative that a second data block stored in the same row of the memory array as the first data block will be targeted within an upcoming control horizon. Thus, in some embodiments, the computing system may control data storage in the caches based at least in part on spatial relationship between storage locations of data blocks in the memory sub-system.

To facilitate considering spatial relationships, in some embodiments, the caches in the computing system may include one or more processor-side caches implemented in its processing sub-system and one or more memory-side caches implemented in its memory sub-system. Additionally, in some embodiments, the caches implemented in the computing system may be hierarchically organized. For example, the caches may be hierarchically organized such that the computing system attempts to retrieve a target data block from a processor-side cache before attempting to retrieve the target data block from a memory-side cache.

Moreover, to facilitate considering spatial relationships, in some embodiments, the computing system may control data storage in the caches based at least in part on spatio-temporal data access information. For example, the spatio-temporal data access information associated with a data block may indicate when any data block stored in the same row of the memory array as the data block was most recently accessed (e.g., targeted). Additionally or alternatively, the spatio-temporal data access information may indicate when any data block stored in a row of the memory array was most recently accessed.

Leveraging the hierarchical organization, in some embodiments, successive cache levels may be implemented with different cache line widths. For example, the memory-side cache may be implemented with a cache line size different from the cache line size implemented in the processor-side cache. Generally, a smaller cache line size may facilitate reducing data output from a cache on a hit and, thus, provide improved data communication efficiency on cache hits. On the other hand, a larger cache line size, as described herein, may enable spatial relationships between data blocks in the memory array to be replicated in a cache and, thus, facilitate reducing the likelihood of cache misses occurring.

Accordingly, in some embodiments, the memory-side cache may be implemented with a cache line size greater than the cache line size implemented in the processor-side cache. As described above, in some embodiments, the cache line size of a processor-side cache may be implemented based at least in part on bit-depth expected to be targeted (e.g., requested and/or accessed) by the processing circuitry. For example, when the processing circuitry is expected to target 64 byte data blocks, the processor-side cache may be implemented with 64 byte cache lines to facilitate improving communication efficiency when a data block is subsequently targeted by the processing circuitry.

Additionally or alternatively, cache line size may be implemented based at least in part on organization of the memory array. For example, when a row of the memory array intersects sixteen 64 byte wide columns, the memory-side cache may be implemented with one kilobyte (e.g., 1024 byte) cache lines. In other words, in some embodiments, cache line size may be set based at least in part on page width of the memory array. Moreover, in some embodiments, a memory controller may adaptively (e.g., dynamically) adjust cache line size implemented in one or more of the caches. For example, a memory-side memory controller may adaptively adjust size of the cache lines implemented in the memory-side cache based at least in part on the application running on the computing device.

In some embodiments, in addition to data, a cache may store associated metadata, for example, which indicates characteristics (e.g., validity and/or identity) of the stored data. To facilitate accounting for differing cache line sizes, in some embodiments, the metadata may include global metadata associated with a cache line and local metadata associated with each data block stored in the cache line. For example, local metadata associated with a data block stored in a cache line may include an indicator or indication (e.g., bit, bits, flag, etc.), which indicates whether the data block has been modified since initially stored in the cache line and/or whether the copy of the data block stored in the cache line is consistent (e.g., coherent) with a downstream copy of the data block. This type of indicator or indication may be referred to as a "dirty indicator."

In fact, in some embodiments, including dirty indicators in the local metadata associated with data blocks may facilitate improving data communication efficiency. For example, to make room for subsequently received data, a memory controller may instruct a cache to flush a cache line based at least in part on data access information associated with cached data blocks and/or data access information associated with the subsequently received (e.g., retrieved) data. At least in some instances, utilizing local metadata may facilitate reducing data output from the cache and, thus, improving data communication efficiency, for example, by enabling the cache to maintain coherency by outputting only the data blocks that have been updated or modified (e.g., as indicated by associated dirty bits).

To facilitate reducing the impact larger cache line sizes may have on data retrieval latency, in some embodiments, the first data block stored in a cache line may be the data block targeted by the processing circuitry. For example, when a target data block is stored in the memory cells in row three and column five of the memory array, the memory sub-system may activate row three via an activation signal output to a word line of row three. After activating row three, the memory sub-system may select column five to output the target (e.g., fifth) data block from the memory array to a cache line, for example, such that the target data block is stored in the cache line along with associated metadata. In this manner, the computing system may provide the cache line including the target data block to the processing circuitry before the cache line is completely filled, which, at least in some instances, may facilitate reducing impact on data retrieval latency.

Generally, activating a row of the memory array consumes more electrical power compared to selecting (e.g., reading or writing) a column of the memory array. Thus, in some embodiments, the memory sub-system may continue storing data blocks from an activated row into a cache line, for example, in the background after a target data block is stored from the activated row into the cache line and the cache line is provided to the processing circuitry. For example, since row three is already activated due to retrieval of the target (e.g., fifth) data block, the memory sub-system may select column one of the memory array to output a first data block to the cache line after the fifth data block via the column select signal. Additionally, the memory sub-system may then select column two of the memory array to output a second data block from the memory array to the cache line after the first data block and so on.

Since multiple data blocks may be successively stored to a cache line, in some instances, a target data block may already be scheduled for retrieval from the memory array, for example, due to spatial relationship resulting in the target data block being located in the same row as the data block previously targeted by the processing circuitry. In some embodiments, when a target data block is already scheduled for retrieval, the cache may wait until each data block stored in the same row as the target data block is stored in the cache line before outputting the cache line, for example, to facilitate reducing complexity of memory access timing and/or arbitration. To facilitate reducing resulting data retrieval latency, in some embodiments, the cache may output the cache line if the target data block is already stored in the cache line and/or as soon as the target data block is stored in the cache line.

Additionally or alternatively, when a target data block is already scheduled for retrieval, the memory sub-system may adaptively adjust retrieval order from the memory array. For example, when a fourth data block stored in column four of row three is targeted before a third data block is output from the memory array to the cache line, the memory sub-system may select column four of the memory array to output the target (e.g., fourth) data block from the memory array to the cache line after the second data block via the column select signal. After storing the fourth data block in the cache line, the memory sub-system may select column three to output the third data block from the memory array to the cache line, select column six of the memory array to output a sixth data block from the memory array to the cache line, and so on.

In this manner, hierarchical caches may be implemented at least in part in a memory sub-system, for example, as one or more memory-side caches, which may be coupled to one or more processor-side caches implemented in a processing sub-system via a coherency data bus. As described above, in some embodiments, the hierarchical caches may be implemented with different cache line sizes, for example, such that a memory-side cache is implemented with a cache line size greater than the cache line size implemented in a processor-side cache.

Moreover, as described above, the different cache line sizes may enable factors, such as temporal factors and/or spatial factors, to be considered when predicting future data access patterns. For example, a memory controller, which may be implemented at a host device and/or in the processing sub-system, may control data storage in a processor-side cache based at least in part on temporal data access information while a memory-side memory controller controls data storage in a memory-side cache based at least in part on spatio-temporal data access information. At least in some instances, implementing and operating the hierarchical caches in this manner may facilitate reducing data retrieval latency and, thus, improving operational efficiency of the computing system, for example, by leveraging the smaller cache line size of the processor-side cache to facilitate reducing amount of data provided to the processing circuitry and/or leveraging the larger cache line size of the memory-side cache to facilitate reducing likelihood of cache misses occurring.

To help illustrate, an example of a computing system 10 (e.g., apparatus), which includes a processing sub-system 12 and a memory sub-system 14, is shown in FIG. 1. It should be appreciated that the depicted embodiment is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, are implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 are implemented in a client device.

In any case, the processing sub-system 12 generally performs various operations during operation of the computing system 10, for example, to determine output data by executing instructions to perform a corresponding operation on input data. Thus, as in the depicted example, the processing sub-system 12 may include processing circuitry 16. In some embodiments, the processing circuitry 16 may include one or more central processing units (CPUs), one or more graphics processing units (GPUs), one or more processor cores, or any combination thereof.

Additionally, the memory sub-system 14 generally stores data accessible to the processing sub-system 12, for example, including the output data, the input data, and/or data that indicates the executable instructions. Thus, as in the depicted example, the memory sub-system 14 may include one or more memory devices 18 (e.g., chips or integrated circuits). As will be described in more detail below, in some embodiments, the memory devices 18 may include memory cells (e.g., circuitry) organized into one or more memory arrays and, thus, may include one or more tangible, non-transitory, computer-readable media. For example, the memory sub-system 14 may include one or more dynamic random-access memory (DRAM) devices, one or more static random-access memory (SRAM) devices, one or more flash (e.g., NAND) memory devices, one or more phase-change memory (e.g., 3D XPoint™) memory devices, one or more ferroelectric random access memory (FeRAM), or any combination thereof.

Moreover, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices each disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

It should be appreciated that one or more of the memory devices 18 may be implemented using other packing techniques. For example, the memory devices 18 may be coupled to a (e.g., silicon) interposer to implement a 2.5D configuration. Additionally or alternatively, the memory devices 18 may be stacked to implement a 3D configuration. Furthermore, in some embodiments, the memory device 18 may be implemented using organic packaging techniques. In other words, the techniques described in the present disclosure may be implemented as an on-package solution.

In any case, as described above, the memory sub-system 14 generally stores data accessible by the processing sub-system 12. To facilitate data communication, the memory sub-system 14 and the processing sub-system 12 may be communicatively via one or more data buses 20. In some embodiments, the data buses 20 may include one or more cables, one or more wires, one or more conductive traces, one or more communication networks, or any combination thereof. In any case, via the one or more data buses 20, the processing sub-system 12 may communicate (e.g., output) data for storage in the memory sub-system 14. Additionally or alternatively, the memory sub-system 14 may communicate (e.g., output) data via the one or more data buses 20 for processing and/or execution in the processing sub-system 12, for example, in response to a request for data targeted by the processing circuitry 16 of the processing sub-system 12.

However, as described above, data communication between different computing sub-systems is generally slower than data communication within a computing sub-system. In other words, data communication within (e.g., internal to) the processing sub-system 12 may be faster and, thus, facilitate reducing data retrieval latency compared to data communication between the processing sub-system 12 and the memory sub-system 14, for example, due to the data buses 20 being shared with other computing sub-systems, timing difference between the processing sub-system 12 and the memory sub-system 14, and/or communication distance between the processing sub-system 12 and the memory sub-system 14. Thus, to facilitate improving operational efficiency, caches may be implemented between the processing circuitry 16 of the processing sub-system 12 and the memory devices 18 of the memory sub-system 14, for example, to store an instance (e.g., copy) of a data block also stored in the memory devices 18.

As in the depicted example, the caches may include one or more processor-side caches 22 implemented in the processing sub-system 12. In some embodiments, one or more of the processor-side caches 22 may be integrated with the processing circuitry 16. For example, the processor-side caches 22 may include an L1 cache, an L2 cache, and/or an L3 cache. To facilitate reducing data retrieval latency, in some embodiments, a processor-side cache 22 may be implemented using different memory compared to the memory devices 18 of the memory sub-system 14. For example, the processor-side cache 22 may be implemented with static random-access memory (SRAM) while the memory devices 18 are implemented with dynamic random-access memory (DRAM).

Additionally, as in the depicted example, the caches may include one or more memory-side caches 24 implemented in the memory sub-system 14. Although implemented in the memory sub-system 14, a memory-side cache 24 may nevertheless provide faster data communication compared to a memory array implemented in the memory devices 18, for example, due to the memory-side cache 24 being implemented with static random-access memory (SRAM) while the memory devices 18 are implemented with dynamic random-access memory (DRAM). Additionally or alternatively, a memory-side cache 24 and a memory array implemented in the one or more memory devices 18 may utilize the same memory type (e.g., DRAM). In fact, in some embodiments, one or more of the memory-side caches 24 may be implemented in the memory devices 18.

Moreover, in some embodiments, the caches may be hierarchically organized. In fact, in some embodiments, a processor-side cache 22 may be hierarchically organized with a memory-side cache 24. To facilitate hierarchically organizing caches, the data buses 20 implemented in the computing system 10 may include one or more coherency buses 20. For example, a coherency data bus 20 may be communicatively coupled between the processor-side cache 22 and the memory-side cache 24 to facilitate maintaining consistency (e.g., coherency) between a first instance of data stored in the processor-side cache 22 and a second instance of the data stored in the memory-side cache 24.

In any case, as in the depicted example, each cache implemented in the computing system 10 may store data via one or more cache lines 23. As will be described in more detail below, in some embodiments, caches in the computing system 10 may be implemented using varying cache line widths. For example, the memory-side cache 24 may be implemented with a line width greater than the processor-side cache 22. In fact, in some embodiments, line width of one or more caches may be adaptively (e.g., dynamically) adjusted, for example, after deployment in the computing system 10.

To facilitate controlling data storage in the caches and/or the memory devices 18, the computing system 10 may include one or more memory controllers 26, for example, communicatively coupled to the caches and/or the memory devices 18 via one or more instruction buses 20A. In some embodiments, one or more of the memory controllers 26 may be implemented in the memory sub-system 14, for example, as a memory-side memory controller 26. Additionally or alternatively, one or more of the memory controllers 26 may be implemented in the processing sub-system 12, for example, as a processor-side memory controller 26.

To help illustrate, an example of a processing sub-system 12A, which includes a processor-side memory controller 26A, is shown in FIG. 2. As described above, in some embodiments, processing circuitry 16 may be implemented using one or more processor cores 28. For example, in the depicted embodiment, the processing circuitry 16A of the processing sub-system 12A includes a first processor core 28A and an Nth processor core 28N.

Additionally, as described above, caches may be hierarchically organized. For example, in the depicted embodiment, the processor-side caches 22A include one or more private processor-side caches 30 and a shared processor-side cache 32, which may be communicatively coupled to a memory-side cache 24 via a coherency bus 20B. In some embodiments, the processor-side caches 22A may be implemented using volatile memory, such as static random-access memory (SRAM) and/or dynamic random-access memory (DRAM).

Additionally, in some embodiments, a private processor-side cache 30 may be dedicated to a corresponding processor core 28 while the shared processor-side cache 32 may be shared between multiple processor cores 28. For example, a first one or more private processor-side caches 30A may be dedicated to the first processor core 28A and an Nth one or more private processor-side caches 30N may be dedicated to the Nth processor core 28N. Additionally, the shared processor-side cache 32 may be shared by the first processor core 28A and the Nth processor core 28N.

In some embodiments, multiple private processor-side caches 30 may be dedicated to a processor core 28 to implement hierarchical cache levels. For example, the first one or more private processor-side caches 30A may include a level one (L1) cache and a second level (L2) cache dedicated to the first processor core 28A. Additionally, the Nth one or more private processor-side caches 30N may include a level one (L1) cache and a second level (L2) cache dedicated to the Nth processor core 28N. Furthermore, the shared processor-side cache 32 may include a level three (L3) cache.

In any case, as described above, a processor-side cache 32 may be implemented to store data via one or more cache lines 23. To help illustrate, an example of a first cache 27, which may be implemented as a processor-side cache 32, is shown in FIG. 3. In particular, the first cache 27 includes multiple cache line 23A of a first type. As in the depicted example, a cache line 23A may be allocated to store a data block 29 and associated metadata 31, for example, concatenated or prepended to the data block 29. It should be appreciated that the depicted example is merely intended to be illustrative and not limiting. For example, in other embodiments, the metadata 31 may be appended to the data block 29 or otherwise associated with the data block 29. Additionally or alternatively, the cache lines 23A may be allocated to store other types of metadata 31.

In any case, in some embodiments, cache lines 23 may be categorized based at least in part on cache line width. For example, the cache lines 23A of the first cache 27 may each be a first type, which uses a first cache line width. As will be describe in more detail below, in some embodiments, different caches may be implemented with different types of cache lines. For example, the caches lines 23 of a second cache may each be a second type, which uses a second cache line width different (e.g., greater or less) than the first cache line width of the first type. As an illustrative example, the first cache line type may utilize smaller cache line width, such as a 64 byte line width or a 128 byte line width, while the second cache line type uses a larger cache line width, such as a one kilobyte line width, a two kilobyte line width, a four kilobyte line width, or an eight kilobyte line width.

In any case, as in the depicted example, a cache line 23A of the first cache 27 may be allocated to store, along with a corresponding data block 29, metadata 31 including tag metadata 33, validity metadata 35, and dirty metadata 37. In this manner, the data block 29 may be associated with metadata 31 that provides context relevant to processing of the data block 29. In other words, the metadata 31 may provide context that facilitates performing an operation on data included in the data block 29 and/or executing instructions indicated in the data block 29.

For example, the validity metadata 35 may indicate whether the data block 29 is valid and, thus, available for output to the processing circuitry 16, another cache, and/or a memory array. In some embodiments, the validity metadata 35 may include a validity bit, which indicates that the data block 29 is valid when set (e.g., "1" bit) and that the data block 29 is invalid when not set (e.g., "0" bit). Additionally or alternatively, the dirty metadata 37 may indicate whether the data block 29 has been updated or modified (e.g., by processing circuitry 16) after initially stored in the cache line 23A and, thus, potential incoherency with another instance of the data block stored in another (e.g., higher level) cache and/or a memory array. In some embodiments, the dirty metadata 37 may include a dirty bit, which indicates that the data block 29 is dirty (e.g., modified) when set (e.g., "1" bit) and that the data block 29 is not dirty (e.g., unmodified) when not set (e.g., "0" bit).

Furthermore, in some embodiments, the tag metadata 33 may indicate identifying parameters of the data block 29. For example, the tag metadata 33 may be indicative of storage location of the data block 29 in an address space. Thus, in some embodiments, the tag metadata 33 may be determined based at least in part on a virtual memory address and/or a physical memory address associated with the data block 29. In fact, in some embodiments, a memory controller 26 may determine whether a data block 29 identified by the processing circuitry 16 using the virtual memory address and/or stored at the physical memory address in a memory array is also stored in a cache by searching the tag metadata 33 included in each of its cache lines 23 with a valid data block 29.

Returning to the processing sub-system 12A of FIG. 2, as described above, a cache generally provides faster data access (e.g., read and/or write) speeds compared to a memory array implemented in the memory devices 18. However, as described above, storage capacity of the cache is generally smaller than storage capacity of the memory array. In fact, in some embodiments, the total storage capacity of the processor-side caches 22A may be smaller than storage capacity of the one or more memory arrays.

Accordingly, to facilitate improving data access speed and, thus, operational efficiency of the computing system 10, the processor-side memory controller 26A may control data storage in the processor-side caches 22A based at least in part on when data is expected to be targeted (e.g., requested) by the processing circuitry 16A. For example, the processor-side memory controller 26A may control data storage such that instances (e.g., copies) of data blocks 29 expected to be targeted by the processing circuitry 16A are stored in one or more of the processor-side caches 22A before the processing circuitry 16A actually targets the data blocks 29. On the other hand, to facilitate conserving (e.g., optimizing) storage capacity of the processor-side caches 22A, the processor-side memory controller 26A may control data storage such that instances of data blocks 29 not expected to be targeted by the processing circuitry 16A during an upcoming control horizon (e.g., duration) are not stored in the processor-side caches 22A.

Moreover, in some embodiments, the processor-side memory controller 26A may control data storage in the processor-side caches 22A based at least in part on hierarchical cache level. For example, the processor-side memory controller 26A may control data storage such that instances of data blocks 29 expected to be targeted by the first processor core 28A during a first upcoming control horizon are stored in the first one or more private processor-side caches 30A. Additionally or alternatively, the processor-side memory controller 26A may control data storage such that instances of data blocks 29 expected to be targeted by the Nth processor core 28N during a second (e.g., different) upcoming control horizon are stored in the Nth one or more private processor-side caches 30N. Furthermore, in some embodiments, the processor-side memory controller 26A may control data storage such that instances of each data block 29 stored in the private processor-side caches 30 are also stored in the shared processor-side cache 32. Additionally or alternatively, the processor-side memory controller 26A may control data storage such that instances of data blocks 29 expected to be targeted by the processing circuitry 16A during a third (e.g., longer) upcoming control horizon are stored in the shared processor-side cache 32 before the processing circuitry 16A actually targets the data blocks 29.

In other words, in some embodiments, the processor-side memory controller 26A may control data storage in the processor-side caches 22A based at least in part on a prediction of when data blocks 29 will actually be targeted (e.g., accessed or requested) by the processing circuitry 16A. Although seemingly random, data access pattern of the processing circuitry 16A is often somewhat cyclical. In other words, when a data block 29 was previously targeted may be indicative of when the data block 29 will again be targeted by the processing circuitry 16A. Thus, as in the depicted example, the processor-side memory controller 26A may control data storage in the processor-side caches 22A based at least in part on temporal data access information 34, for example, associated with data blocks 29 that may potentially be stored in the processor-side caches 22A.

To help illustrate, an example of temporal data access information 34A, which may be monitored and/or utilized by a memory controller 26, is shown in FIG. 4. As in the depicted example, the temporal data access information 34A may include a table with multiple rows 36, a block identifier column 38, a write time column 40, a last accessed column 42, and an access count column 44. It should be appreciated that the depicted example is merely intended to be illustrative and not limiting. For example, in other embodiments, the temporal data access information 34 may additionally or alternatively include other types of data and/or information.

In any case, with regard to the depicted embodiment, each row 36 in the temporal data access information 34A may associate a data block 29 identified in the block identifier column 38 (e.g., via its virtual memory address, physical memory address, and/or tag metadata 33) to a write time parameter indicated in the write time column 40, a last accessed parameter indicated in the last accessed column 42, and an access count parameter indicated in the access count column 44. For example, the first row 36A may associate a first data block 29 with a write time parameter that indicates when the first data block 29 was initially stored in the memory sub-system 14, a last accessed parameter that indicates when the first data block 29 was most recently accessed (e.g., targeted), and an access count parameter that indicates the number of times the first data block 29 has previously been accessed. Additionally, the second row 50B may associate a second data block 29 with a write time parameters parameter that indicates when the second data block 29 was initially stored in the memory sub-system 14, a last accessed parameter that indicates when the second data block 29 was most recently accessed, and an access count parameter that indicates the number of times the second data block 29 has previously been accessed. Furthermore, the third row 50C may associate a third data block 29 with a write time parameter that indicates when the third data block 29 was initially stored in the memory sub-system 14, a last accessed parameter that indicates when the third data block 29 was most recently accessed, and an access count parameter that indicates the number of times the third data block 29 has previously been accessed.

Since data access is often somewhat repetitive (e.g., cyclical), a memory controller 26 may predict when data blocks 29 will subsequently be targeted based least in part on corresponding temporal data access information 34 and adjust data storage within the caches accordingly. For example, a processor-side memory controller 26A may predict when the first data block 29 will subsequently be targeted based at least in part on a corresponding last accessed parameter, which indicates when the first data block 29 was most recently targeted (e.g., accessed or requested). Additionally, the processor-side memory controller 26A may control data storage such that an instance (e.g., copy) of the first data block 29 is stored in one or more of the processor-side caches 22 before the processing circuitry 16 actually targets the first data block 29.

Figure 5:
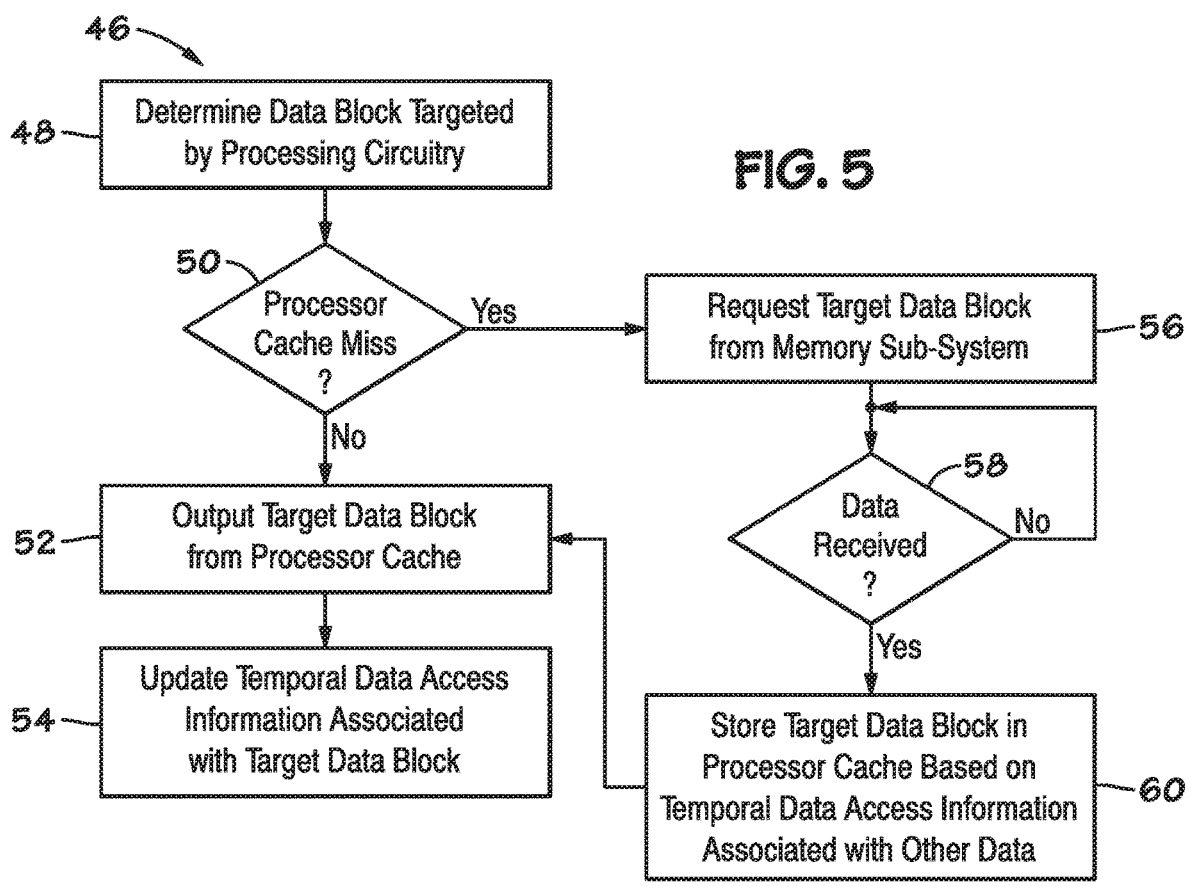
FIG. 5 is a flow diagram of an example process for operating the processing sub-system of FIG. 2, in accordance with an embodiment of the present disclosure.

To help further illustrate, an example of a process 46 for operating a memory controller 26, such as a processor-side memory controller 26A, is described in FIG. 5. Generally, the process 46 includes determining a data block targeted by processing circuitry (process block 48) and determining whether the target data block results in a processor-side cache miss (decision block 50). Additionally, when a processor-side cache miss results, the process 46 includes requesting the target data block from a memory sub-system (process block 56), determining whether the target data block has been received from the memory sub-system (decision block 58), and storing the target data block in a processor-side cache based on temporal data access information associated with other data (process block 60). Furthermore, the process 46 includes outputting the target data block from the processor-side cache (process block 52) and updating temporal data access information associated with the target data block (process block 54).

Although described in a particular order, which represents a particular embodiment, it should be noted that the process 46 may be performed in any suitable order. Additionally, embodiments of the process 46 may omit process blocks and/or include additional process blocks. Moreover, in some embodiments, the process 46 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., processor-side memory controller 26A) may determine a data block 29 targeted by processing circuitry 16 of a computing system 10 (process block 48). In some embodiments, processing circuitry 16 may identify a target data block 29 using a corresponding (e.g., target) virtual memory address, for example, included in a memory access request. Based at least in part on the target virtual memory address, the memory controller 26 may determine a corresponding (e.g., target) physical memory address, which indicates storage location of the target data block 29 in the computing system 10.

Additionally, the memory controller 26 may determine whether the target data block 29 results in a processor-side cache miss (decision block 50). As described above, in some embodiments, the memory controller 26 may determine whether a data block 29 is stored in a cache based at least in part on a virtual memory address and/or a physical memory address associated with the data block 29. For example, based at least in part on its virtual memory address and physical memory address, the memory controller 26 may determine a target value of tag metadata 33 expected to be associated with the target data block 29.

By searching valid cache lines 23 included in the processor-side caches 22 based on the target tag metadata value, the memory controller 26 may determine whether the target data block 29 results in a processor-side cache miss. For example, when the target tag metadata value does not match the tag metadata 33 included in any of the cache lines 23 implemented in the processor-side caches 22, the memory controller 26 may determine that the target data block 29 results in a processor-side cache miss. On the other hand, when the tag metadata 33 is included in one or more cache lines 23 implemented in the processor-side caches 22, the memory controller 26 may determine that the target data block 29 results in a processor-side cache hit and, thus, does not result in a processor-side cache miss.

As such, when the target data block 29 does not result in a processor-side cache miss, the memory controller 26 may instruct the processor-side caches 22 to supply the target data block 29 to the processing circuitry 16 to facilitate improving data retrieval speed and, thus, operational efficiency of the computing system 10 (process block 52). In some embodiments, a processor-side caches 22 may output a cache line 23 with tag metadata 33 that matches the target tag metadata value expected to be associated with the target data block 29. When stored in a higher level cache (e.g., shared processor-side cache 32), in some embodiments, the target data block 29 may pass through one or more lower level caches (e.g., private processor-side caches 30) before reaching the processing circuitry 16.

On the other hand, when it results in a processor-side cache miss, the memory controller 26 may request the target data block 29 from a memory sub-system 14 of the computing system 10 (process block 56). In some embodiments, the memory controller 26 may instruct the memory sub-system 14 to retrieve the target data block 29 by outputting a memory access request that identifies the target data block 29 via its virtual memory address. Additionally or alternatively, the memory controller 26 may supply the memory sub-system 14 the physical memory address that indicates storage location of the target data block 29 in the memory sub-system 14. In fact, in some embodiments, the memory controller 26 (e.g., a processor-side memory controller 26A) may instruct and/or request another memory controller 26 implemented in the memory sub-system 14 to supply the target data block 29 to the processing sub-system 12 of the computing system 10.

Figure 6:
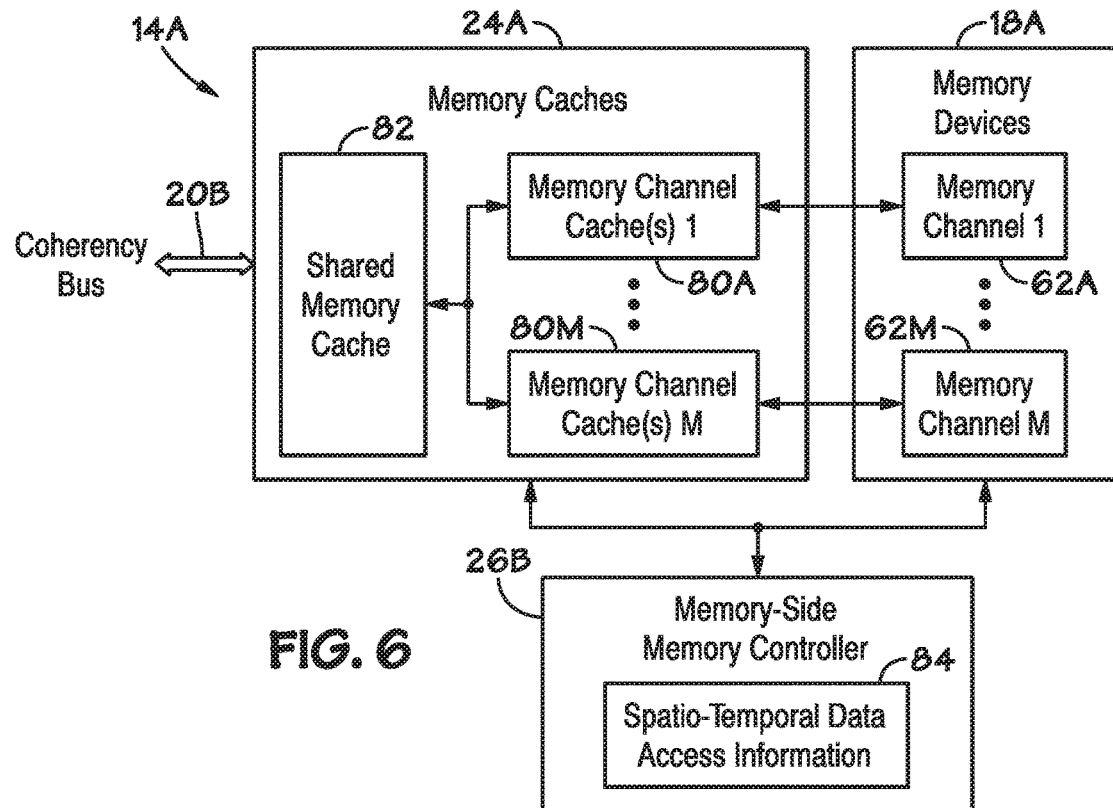
FIG. 6 is a block diagram of an example of the memory sub-system of FIG. 1 with a memory-side memory controller, in accordance with an embodiment of the present disclosure.

To help illustrate, an example of a memory sub-system 14A, which includes a memory-side memory controller 26B, is shown in FIG. 6. As described above, in some embodiments, memory devices 18 may include memory cells organized to implement one or more memory arrays each corresponding with a memory channel 62. For example, the memory cells in the memory devices 18A of the memory sub-system 14A may be organized into a first memory array to implement a first memory channel 62A and into an Mth memory array to implement an Mth memory channel 62M.

Figures 7, 8:
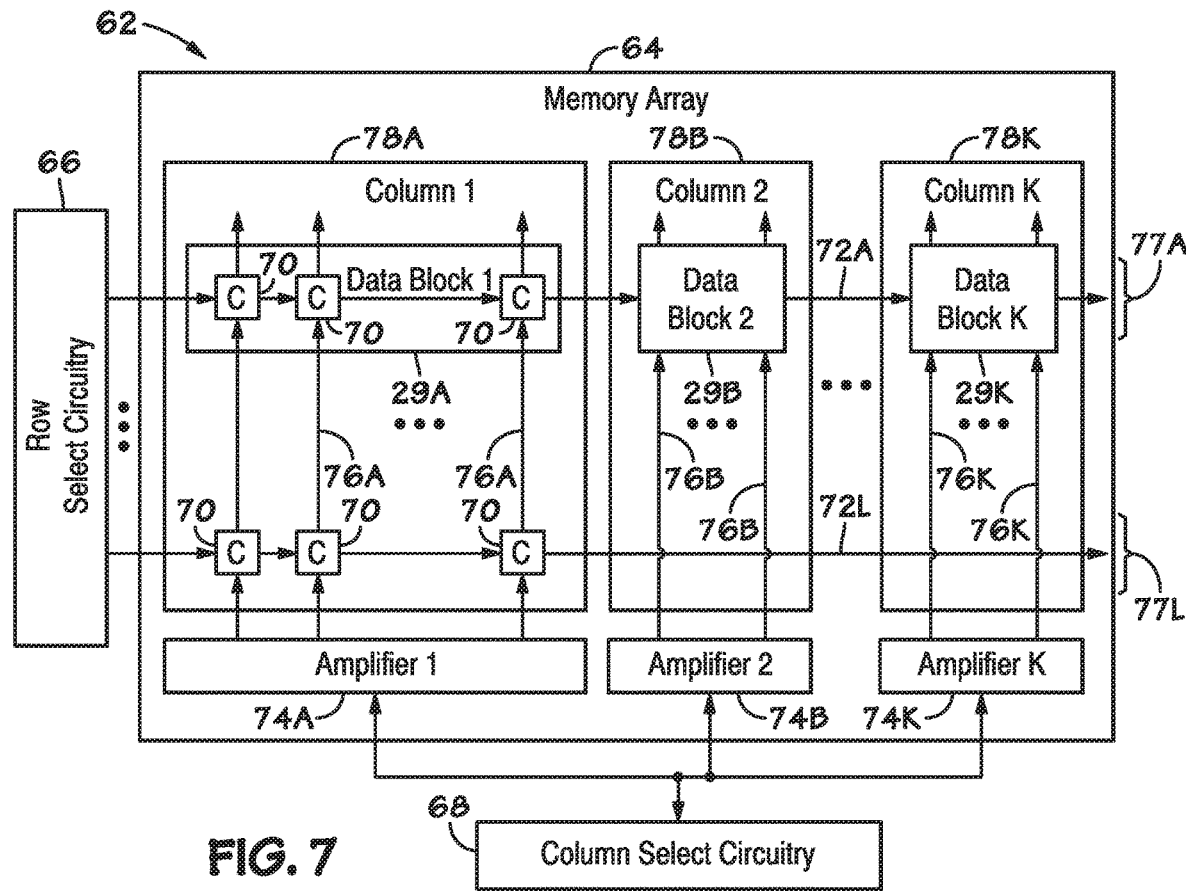
FIG. 7 is a block diagram of a memory channel including a memory array, in accordance with an embodiment of the present disclosure.
FIG. 8 is a diagrammatic representation of example spatio-temporal data access information used by the memory-side memory controller of FIG. 5, in accordance with an embodiment of the present disclosure.

To help illustrate, an example of a memory channel 62, which includes a memory array 64, is shown in FIG. 7. As in the depicted example, the memory channel 62 may additionally include row select (e.g., decoder) circuitry 66 and column select (e.g., decoder) circuitry 68. Additionally, as in the depicted example, the memory array 64 may include memory cells 70 coupled to the row select circuitry 66 via word lines 72 formed in a first (e.g., horizontal) and to amplifier circuitry 74 via bit lines 76 formed in a second (e.g., vertical) direction.

In some embodiments, each memory cell 70 may include a switching component, such as a metal-oxide-semiconductor field-effect transistor (MOSFET), and a storage component, such as a capacitor. For example, a memory cell 70 may be implemented such that its MOSFET is coupled between a bit line 76 and its storage capacitor and the gate of its MOSFET is coupled to a word line 72. Thus, to enable reading and/or writing a memory cell 70, the row select circuitry 66 may activate the memory cell 70, for example, by outputting an activation (e.g., logic high) signal via a corresponding word line 72 that causes the switching component of the memory cell 70 to electrically couple the storage component of the memory cell 70 to a corresponding bit line 76.

Thus, in such embodiments, each memory cell 70 may be used to store one bit of data. For example, a memory cell 70 may indicate a 1-bit when charge stored in the memory cell 70 results in a voltage greater than a threshold voltage. On the other hand, the memory cell 70 may indicate a 0-bit when charge stored in the memory cell 70 results in a voltage less than the threshold voltage. In some embodiments, the amplifier circuitry 74 may include a driver to facilitate storing (e.g., writing) data into the memory cells 70 and/or sense amplifier to facilitate outputting (e.g., reading) data from the memory cells 70.

To facilitate accessing storage location in a memory channel 62, the memory array 64 may be organized into one or more memory cell rows 77 each identified by a corresponding row address (e.g., physical memory address) and one or more memory cell columns 78 each identified by a corresponding column address (e.g., physical memory address). In some embodiments, a memory cell row 77 may include each of the memory cells 70 coupled to a (e.g., one) word line 72. For example, in the depicted embodiment, a first memory cell row 77A may include each of the memory cells 70 coupled to a first word line 72A and an Lth memory cell row 77L may include each of the memory cells 70 coupled to an Lth word line 72.

To facilitate interoperability with processing circuitry 16, in some embodiments, the memory cells 70 may be organized into memory cells columns 78 based at least in part on characteristics of data blocks 29 expected to be targeted by the processing circuitry 16. For example, when the processing circuitry 16 is expected to target 64 byte (e.g., 1024 bit) data blocks 29, a memory cell column 78 may include each of the memory cells 70 coupled to one of 1024 bit lines 76. In other words, in some embodiments, a memory cell column 78 may include each of the memory cells 70 coupled to multiple bit lines 76. For example, in the depicted embodiment, a first memory cell column 78A may include each of the memory cells 70 coupled to any of first bit lines 76A, a second memory cell column 78B may include each of the memory cells 70 coupled to any of second bit lines 76B, and a kth memory cell column 78K may include each of the memory cells 70 coupled to any of Kth bit lines 76K.

Additionally, in some embodiments, the column select circuitry 68 may selectively enable reading from and/or writing to a memory cell column 78, for example, by outputting a column select to corresponding amplifier circuitry 74. For example, in the depicted embodiment, the column select circuitry 68 may read a first data block 29A from the first memory cell column 78A and/or write the first data block 29A to the first memory cell column 78A by outing a column select (e.g., logic high) signal to first amplifier circuitry 74A. Additionally, the column select circuitry 68 may read a second data block 29B from the second memory cell column 78B and/or write the second data block 29B to the second memory cell column 78B by outing a column select signal to second amplifier circuitry 74B. Furthermore, the column select circuitry 68 may read a Kth data block 29K from the Kth memory cell column 78K and/or write the Kth data block 29K to the Kth memory cell column 78K by outing a column select signal to second amplifier circuitry 74B. In this manner, memory devices 18 in a memory sub-system 14 may be organized into one or more memory channels 62 and corresponding memory arrays 64.

Returning to the memory sub-system 14A of FIG. 6, as described above, caches may be hierarchically organized. For example, in the depicted embodiment, the memory-side caches 24A may be implemented with one or more memory channel caches 80 and a shared memory-side cache 82, which may be communicatively coupled to one or more processor-side caches 22 via a coherency bus 20B. In some embodiments, the memory-side caches 24A may be implemented using volatile memory, such as static random-access memory (SRAM) and/or dynamic random-access memory (DRAM). Furthermore, in some embodiments, one or more of the memory-side caches 24A may be implemented in the same memory device 18 as a memory array 64. Additionally or alternatively, one or more of the memory-side caches 24A may be implemented using a standalone (e.g., separate) memory device 18.

In some embodiments, a memory channel cache 80 may be dedicated to a corresponding memory channel 62 while the shared memory-side cache 82 may be shared between multiple memory channels 62. For example, a first one or more memory channel caches 80A may be dedicated to the first memory channel 62A and an Mth one or more memory channel caches 80M may be dedicated to the Mth memory channel 62M. Additionally, the shared memory-side cache 82 may be shared by the first memory channel 62A and the Mth memory channel 62M.

Moreover, in some embodiments, the memory-side caches 24A may be hierarchically organized with one or more processor-side caches 22. For example, the shared memory-side cache 82 may be implemented to provide a higher cache level relative to a shared processor-side cache 32. In some embodiments, hierarchically organizing caches may enable the caches to be implemented with varying cache line widths. For example, since it is a higher cache level, the memory-side cache 24 may be implemented with a cache line width greater than a cache line width implemented in the processor-side cache 22.

Nevertheless, the total storage capacity of the memory-side caches 24A is generally still smaller than the storage capacity of the memory arrays 64. Accordingly, to facilitate improving data access speed and, thus, operational efficiency of the computing system 10, the memory-side memory controller 26B may control data storage in the memory-side caches 24A based at least in part on when data is expected to be targeted (e.g., requested) by the processing circuitry 16A. For example, the memory-side memory controller 26B may control data storage such that instances (e.g., copies) of data blocks 29 expected to be targeted by the processing circuitry 16 are stored in one or more of the memory-side caches 24A before the processing circuitry 16A actually targets the data blocks 29. On the other hand, to facilitate conserving (e.g., optimizing) storage capacity of the memory-side caches 24A, the memory-side memory controller 26B may control data storage such that instances of data blocks 29 not expected to be targeted by the processing circuitry 16A during another (e.g., longer) upcoming control horizon (e.g., duration) are not stored the memory-side caches 24A.

Moreover, in some embodiments, the memory-side memory controller 26B may control data storage in the memory-side caches 24A based at least in part on hierarchical cache level. For example, the memory-side memory controller 26B may control data storage such that instances of data blocks 29 stored in a memory array 64 of the first memory channel 62A and expected to be targeted by the processing circuitry 16 during an upcoming control horizon are stored in the first one or more memory channel caches 80A. Additionally or alternatively, the memory-side memory controller 26B may control data storage such that instances of data blocks 29 stored in a memory array 64 of the Mth memory channel 62M and expected to be targeted by the processing circuitry 16 during an upcoming control horizon are stored in the Mth one or more memory channel caches 80M. Furthermore, in some embodiments, the memory-side memory controller 26B may control data storage such that instances of each data block 29 stored in the memory channel caches 80 are also stored in the shared memory-side cache 82.

In other words, similar to the processor-side memory controller 26A, the memory-side memory controller 26B may control data storage in the memory-side caches 24A based at least in part on a prediction of when data blocks 29 will actually be targeted (e.g., accessed or requested) by the processing circuitry 16. However, since implemented as higher cache levels and temporal factors (e.g., temporal data access information 34) are considered in lower cache levels, in some embodiments, the memory-side memory controller 26B may consider other factors, such as spatial factors, likely to be indicative of subsequent data access pattern. In particular, at least in some instances, storage location (e.g., row address and column address pairing) of data blocks 29 in a memory array 64 of a memory channel 62 may be indicative data access pattern. For example, access to the first data block 29A stored in the first memory cell row 77A may be indicative that the second data block 29B, which is also stored in the first memory cell row 77A, will be targeted within an upcoming control horizon.

In other words, in some embodiments, the memory-side memory controller 26B may control data storage in the memory-side caches 24A based at least in part on spatial relationship between storage locations of data blocks 29 in the memory sub-system 14A. In fact, in some embodiments, the larger cache line widths may facilitate replicating the spatial relationship of the data blocks 29 in the memory-side caches 24A. Thus, as in the depicted example, the memory-side memory controller 26B may control data storage in the memory-side caches 24A based at least in part on spatio-temporal data access information 84, for example, associated with data blocks 29 that may potentially be stored in the memory-side caches 24A.

To help illustrate, an example of spatio-temporal data access information 84A, which may be monitored and/or utilized by a memory controller 26, is shown in FIG. 8. As in the depicted example, the spatio-temporal data access information 84A may include a table with multiple rows 86, a block identifier column 88, a related block identifier column 90, and a last related access column 92. It should be appreciated that the depicted example is merely intended to be illustrative and not limiting. For example, in other embodiments, the spatio-temporal data access information 84 may additionally or alternatively include other types of data and/or information.

In any case, with regard to the depicted example, each row 86 in the spatio-temporal data access information 84A may associate a data block 29 identified in the block identifier column 88 (e.g., its virtual memory address, physical memory address, and/or tag metadata 33) to spatially related data blocks 29 identified in the related block identifier column 90 and a last related access parameter indicated in the last related access column 92. In some embodiments, data blocks 29 may be identified as spatially related when stored in the same memory cell row 77 of a memory array 64. For example, a first row 86A of the spatio-temporal data access information 84A may associate the first data block 29A with the second data block 29B, the Kth data block 29K, and any other data blocks 29 stored in the first memory cell row 77A of the memory array 64. Additionally, the first row 86A may associate the first data block 29A with a last related access parameter, which indicates the most recent time a data block 29 stored in the first memory cell row 77A was targeted.

In a similar manner, the spatio-temporal data access information 84A may associate data blocks 29 stored in other memory cell rows 77 with corresponding last related access parameters. For example, a second row 86B of the spatio-temporal data access information 84A may associate the Kth data block 29K with each of the other data blocks 29 stored in the first memory cell row 77A and the last related access parameter, which indicates the most recent time a data block 29 stored in the first memory cell row 77A was targeted. Additionally or alternatively, a third row 86C of the spatio-temporal data access information 84A may associate data blocks 29 stored in the Lth memory cell row 77L of the memory array with a last related access parameter, which indicates the most recent time a data block 29 stored in the Lth memory cell row 77L was targeted. In other embodiments, other spatial relationships may additionally or alternatively used to categorize data blocks 29 as spatially related. For example, data blocks 29 may be identified as spatially related when stored in the same memory cell column 78 of a memory array 64.

In any case, since spatial relationship between storage location of data blocks 29 is often indicative of data access pattern, a memory controller 26 may predict when data blocks 29 will subsequently be targeted based on at least in part on corresponding spatio-temporal data access information 84 and adjust data storage in the caches accordingly. In some embodiments, this may entail predicting whether a data block 29 will be targeted within a second upcoming control horizon, for example, longer than the first upcoming control horizon considered by the processor-side memory controller 26A. For example, during operation, a memory-side memory controller 26B may predict when the Kth data block 29K will subsequently be targeted based at least in part on the last related access parameter, which indicates the most recent time a data block 29 stored in the first memory cell row 77A was targeted. Additionally, during operation, the memory-side memory controller 26B may control data storage such that an instance (e.g., copy) of the Kth data block 29K is stored in one or more of the memory-side caches 24 before the processing circuitry 16 actually targets the Kth data block 29K.

Figure 9:
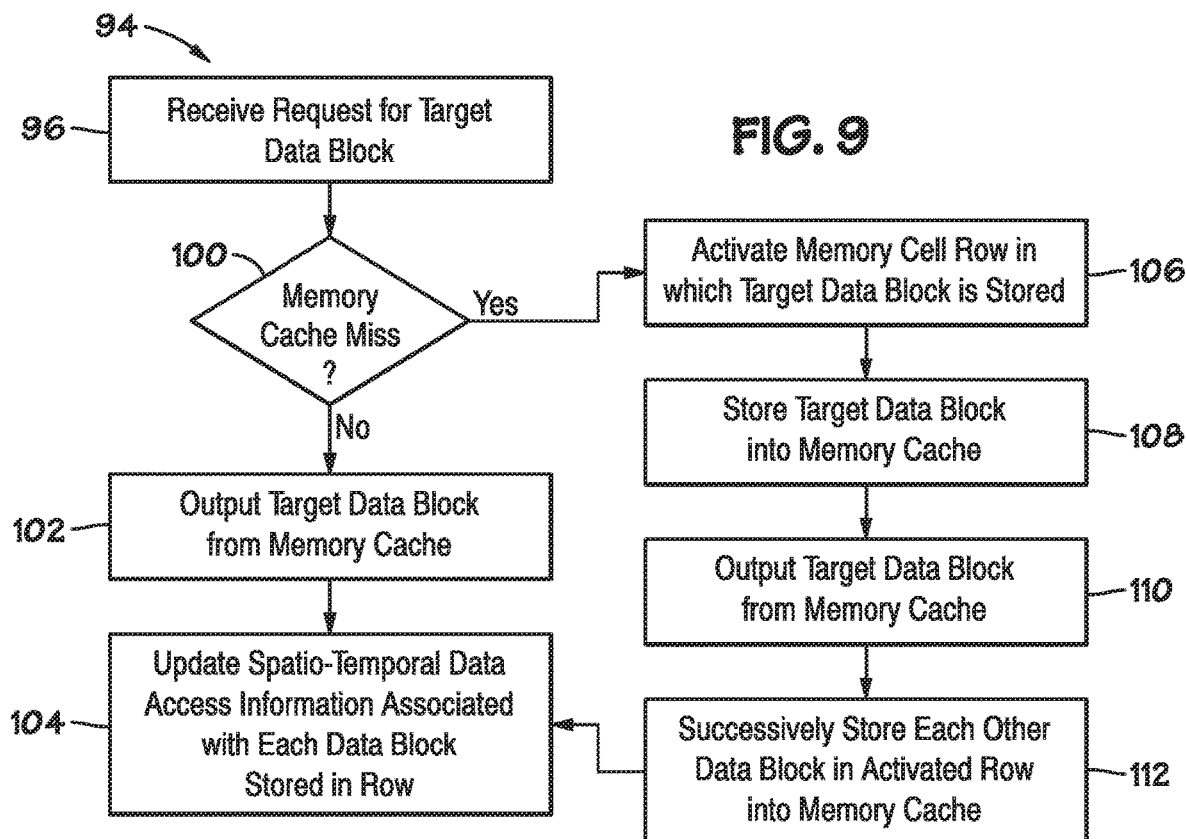
FIG. 9 is a flow diagram of an example process for operating the memory sub-system of FIG. 5, in accordance with an embodiment of the present disclosure.

To help further illustrate, an example of a process 94 for operating a memory controller 26, such as a memory-side memory controller 26B, is described in FIG. 9. Generally, the process 94 includes receiving a request for a target data block (process block 96), determining whether the target data block results in a memory-side cache miss (decision block 100), and outputting the target data block from a memory-side cache when the target data block does not result in a memory-side cache miss (process block 102). When the target data block results in a memory-side cache miss, the process 94 includes activating a memory cell row in which the target data block is stored (process block 106), storing the target data block into the memory cache (process block 108), outputting the target data block from the memory cache (process block 110), and successively storing each other data block stored in the activated memory cell row into the memory-side cache (process block 112). Additionally, the process 94 includes updating spatio-temporal data access information data access information associated with each data block stored in the same memory cell row as the target data block (process block 104).

Although described in a particular order, which represents a particular embodiment, it should be noted that the process 94 may be performed in any suitable order. Additionally, embodiments of the process 94 may omit process blocks and/or include additional process blocks. Moreover, in some embodiments, the process 94 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may receive a memory access request identifying a data block 29 targeted by processing circuitry 16 of a computing system 10, for example, from the processing circuitry 16 or a memory controller 26 implemented in the processing sub-system 12 (process block 96). In some embodiments, a memory access request may identify a target data block 29 via its virtual memory address. Additionally or alternatively, the memory access request may identify the target data block 29 via its physical memory address, which indicates storage location of the target data block 29 in the memory sub-system 14. For example, the physical memory address may include a row address, which indicates the memory cell row 77 in which the target data block 29 is stored, and a column address, which indicates the memory cell column 78 in which the target data block 29 is stored.

Additionally, the memory controller 26 may determine whether the target data block 29 results in a memory-side cache miss (decision block 100). As described above, in some embodiments, the memory controller 26 may determine whether a data block 29 is stored in a cache based at least in part on a virtual memory address and/or a physical memory address associated with the data block 29. For example, based at least in part on its virtual memory address and physical memory address, the memory controller 26 may determine a target value of tag metadata 33 expected to be associated with the target data block 29.

By searching valid cache lines 23 included in the memory-side caches 24 based on the target tag metadata value, the memory controller 26 may determine whether the target data block 29 results in a memory-side cache miss. For example, when the target tag metadata value does not match the tag metadata 33 included in any of the cache lines 23 implemented in the memory-side caches 24, the memory controller 26 may determine that the target data block 29 results in a memory-side cache miss. On the other hand, when the tag metadata 33 is included in one or more cache lines 23 implemented in the memory-side caches 24, the memory controller 26 may determine that the target data block 29 results in a memory-side cache hit and, thus, does not result in a memory-side cache miss.

To facilitate improving data retrieval speed and, thus, operational efficiency of the computing system 10, when the target data block 29 does not result in a memory-side cache miss, the memory controller 26 may instruct the memory-side caches 24 to output the target data block 29, for example, to one or more of the processor-side caches 22 via a coherency bus 20B (process block 102). To facilitate supplying the target data block 29 to the processing circuitry 16, in some embodiments, a memory-side cache 24 may output a cache line 23 with tag metadata 33 that matches the target tag metadata value expected to be associated with the target data block 29. Additionally, when stored in a higher level cache (e.g., memory channel cache 80), the target data block 29 may pass through one or more lower level caches (e.g., shared memory-side caches 82 and/or processor-side caches 22) before reaching the processing circuitry 16.

On the other hand, when it results in a memory-side cache miss, the memory controller 26 may instruct the row select circuitry 66 to activate a memory cell row 77 of a memory array 64 in which the target data block 29 is stored (process block 106). In some embodiments, the row select circuitry 66 may activate the memory cell row 77 identified by a row address associated with the target data block 29. Additionally, in some embodiments, the row select circuitry 66 may activate the memory cell row 77 by outputting an activation (e.g., logic high) signal to a word line 72 coupled to the memory cells 70 of the memory cell row 77.

To facilitate improving future (e.g., subsequent) data retrieval speeds, the memory controller 26 may instruct the memory sub-system 14 to store an instance (e.g., copy) of the target data block 29 in one or more of the memory-side caches 24 (process block 108). In some embodiments, the column select circuitry 68 may read the target data block 29 from the activated memory cell row 77 by selecting amplifier circuitry 74 coupled to a memory cell column 78 identified by the column address. Additionally or alternatively, the column select circuitry 68 may mux outputs from each memory cell column 78 based on the column address associated with the target data block 29.

To facilitate reducing the amount of impact a memory-side cache miss has on data retrieval speed, the memory controller 26 may instruct the memory-side caches 24 to output the target data block 29 to the processing sub-system 12 (process block 110) before instructing the memory sub-system 14 to successively store instances (e.g., copies) of other data blocks 29 stored in the activated memory cell row 77 (process block 112). In some embodiments, a memory-side cache 24 may cache instances of data blocks 29 stored in the same memory cell row 77 of a memory array 64 in the same cache line 23. In other words, in such embodiments, the memory-side cache 24 may output a cache line 23 before it is completely filled, for example, with only the target data block 29 and associated metadata 31. Additionally, in such embodiments, a memory-side cache 24 may be implemented with a larger cache line width compared to a lower level cache, such as a processor-side cache 22.

Figure 10:
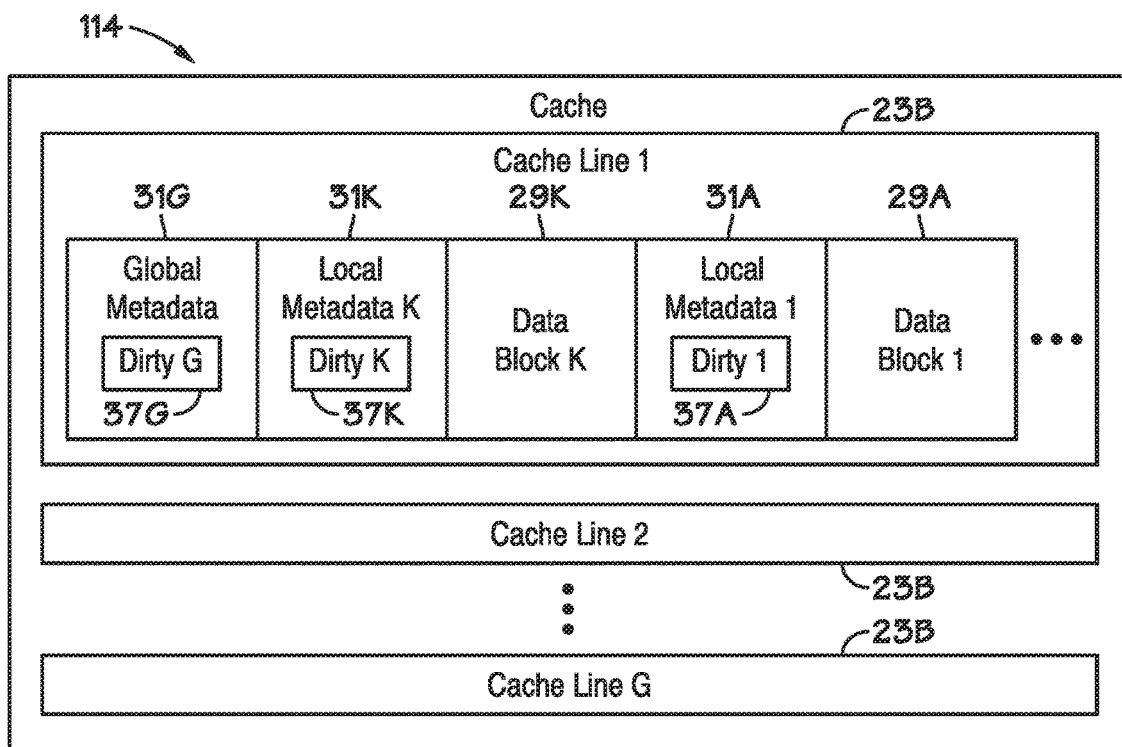
FIG. 10 is a diagrammatic representation of an example if a second cache, in accordance with an embodiment of the present disclosure.

To help illustrate, an example of a second cache 114, which may be implemented as a memory-side cache 24, is shown in FIG. 10. In particular, the second cache 114 includes multiple cache lines 23B of a second type. As in the depicted example, a cache line 23B may be allocated to store multiple data blocks 29 and associated metadata 31, for example, concatenated or interleaved with the data blocks 29. In other words, the caches lines 23B of the second cache 114 may be implemented with a second cache line width that is greater (e.g., larger) than the first cache line width implemented in the first cache 27 of FIG. 3. As an illustrative example, the first cache 27 may utilize cache lines 23A with a smaller line width, such as a 64 byte line width or a 128 byte line width, while the second cache 114 uses cache lines 23B with a larger line width, such as a one kilobyte line width, a two kilobyte line width, a four kilobyte line width, or an eight kilobyte line width.

Nevertheless, it should be appreciated that the depicted example is merely intended to be illustrative and not limiting. For example, in other embodiments, the line width may be adjusted to adaptively (e.g., dynamically) adjust number of data blocks 29 that may be stored in a cache line 23B. Additionally or alternatively, the cache lines 23B may be allocated to store other types of metadata 31.

In any case, with regard to the depicted example, a cache line 23B may be allocated to store global metadata 31G and local metadata 31. In some embodiments, local metadata 31 may provide may provide content relevant to processing of a corresponding data block 29. For example, first local metadata 31A may provide context relevant to processing of the first data block 29A and Kth local metadata 31K may provide context relevant to processing of the Kth data block 29K. Thus, as in the depicted example, the first local metadata 31A may include first dirty metadata 37A, which indicates whether the first data block 29A has been updated or modified (e.g., by processing circuitry 16) after initially stored in the cache line 23B, and the Kth local metadata 31K may include Kth dirty metadata 37K, which indicates whether the Kth data block 29K has been updated or modified after initially stored in the cache line 23B

Additionally, in some embodiments, global metadata 31G may provide context relevant to processing of each data block 29 stored in a corresponding cache line 23B. For example, the global metadata 31G may provide context relevant to processing of the first data block 29A and Kth data block 29K. Thus, as in the depicted example, the global metadata 31G may include global dirty metadata 37G, which indicates whether any data block 29 stored in the cache line 23B has been updated or modified (e.g., by processing circuitry 16) after initially stored in the cache line 23B.

Although depicted with multiple data blocks 29, as described above, in some embodiments, a cache line 23B may be iteratively (e.g., successively) filled. In other words, in the depicted example, the Kth data block 29K and Kth local metadata 31K may be stored in the cache line 23B before the first data block 29A and the first local metadata 31A. Accordingly, to facilitate reducing the impact a memory-side cache miss has on data retrieval speed, an initially targeted data block 29 may be stored in a cache line 23B before any other data block 29. Thus, the cache line 23B depicted in the second cache 114 may result when the Kth data block 29K, which is stored in the first memory cell row 77A and the Kth memory cell column 78K, is the initially targeted data block 29. Additionally, when the Kth data block 29K is the initially targeted data block 29, the second cache 114 may output the cache line 23B before any other data block 29 of the first memory cell row 77A is stored in the cache line 23B, for example, with only the global metadata 31G, the Kth local metadata 31K, and the Kth data block 29K.

In this manner, the target data block 29 may begin being propagated to the processing circuitry 16 as soon as possible, for example, via one or more lower level caches. After outputting the cache line 23B, the second cache 114 may resume filling the cache line 23B with other data blocks 29, which are spatially related to the target data block 29, and associated local metadata 31. For example, the first data block 29A and the first local metadata 31A may be stored in the cache line 23B directly after the Kth data block 29K and Kth local metadata 31K. Although not depicted, the second data block 29B and associated local metadata 31 may be then be stored in the cache line 23B, for example, directly after the first data block 29A and the first local metadata 31A.

In fact, in some embodiments, the second cache 114 may background fill its cache line 23B while the processing circuitry 16 continues operation. For example, the second cache 114 may store the first data block 29A and the first local metadata 31A into its cache line 23B while the processing circuitry 16 is executing an instruction and/or performing an operation on data included in the target data block 29 (e.g., Kth data block 29K). Due at least in part to spatial relationship of storage locations in a memory array 64 being indicative of data access pattern, at least in some instances, controlling data storage in higher level caches (e.g., memory-side cache 24) in this manner may facilitate improving operational efficiency of the computing system 10, for example, by reducing likelihood of a target data block 29 resulting in a cache miss.

However, in some instances, successively storing the other data blocks 29 in the cache line 23B may result in a data block 29 already being scheduled for caching, but not yet actually stored in the cache line 23B when subsequently targeted. For example, in response to Kth data block 29K being targeted, the second cache 114 may successively store the Kth data block 29K, the first data block 29A, the second data block 29B, and so on. However, when a K-lth data block 29, which is stored in the first memory cell row 77A and a K-lth memory cell column 78, is targeted shortly after the Kth data block 29K, the second cache 114 may not yet have stored the K-lth data block 29 in the cache line 23B. Thus, in some embodiments, a memory-side memory controller 26B may operate to control data storage in one or more of the memory-side caches 24 based at least in part on when the processing circuitry 16 actually targets data blocks 29 and/or operational parameters of the one or more memory arrays 64.

Figure 11:
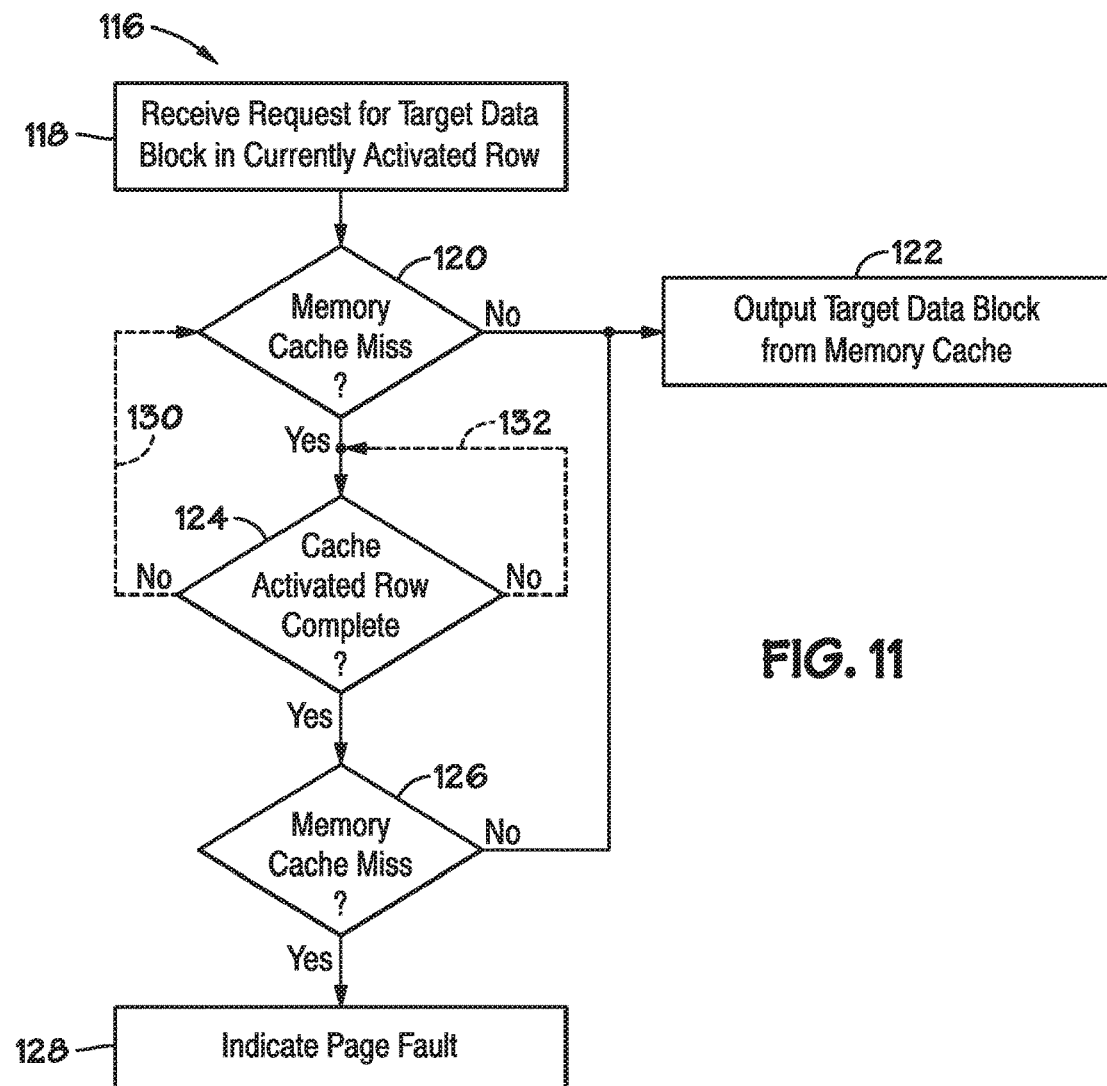
FIG. 11 is a flow diagram of another example process for operating the memory sub-system of FIG. 5, in accordance with an embodiment of the present disclosure.

To help illustrate, another example of a process 116 for operating a memory controller 26, such as a memory-side memory controller 26B, is described in FIG. 11. Generally, the process 116 includes receiving a request for a target data block stored in a currently activated row (process block 118), determining whether the target data block results in a memory-side cache miss (decision block 120), and outputting the target data block from a memory cache when the target data block does not result in a memory-side cache miss (process block 122). When the target data block results in a memory-side cache miss, the process 116 includes determining whether caching of the activated row is complete (decision block 124), determining whether the target data block results in a memory-side cache when caching of the activated row is complete (decision block 126), and indicating a page fault when the target data block results in a memory-side cache miss (process block 128).

Although described in a particular order, which represents a particular embodiment, it should be noted that the process 116 may be performed in any suitable order. Additionally, embodiments of the process 116 may omit process blocks and/or include additional process blocks. Moreover, in some embodiments, the process 116 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may receive a memory access request identifying a target data block 29 that is stored in a currently activated memory cell row 77, for example, due to another data block 29 stored in the memory cell row 77 previously being targeted by processing circuitry 16 of a computing system 10 (process block 118). As described above, in some embodiments, a memory access request may identify a target data block 29 via its virtual memory address. Additionally or alternatively, the memory access request may identify the target data block 29 via its physical memory address, which indicates storage location of the target data block 29 in the memory sub-system 14. For example, the physical memory address may include a row address, which indicates the memory cell row 77 in which the target data block 29 is stored, and a column address, which indicates the memory cell column 78 in which the target data block 29 is stored.

To facilitate determining whether the target data block 29 is stored in a currently activated memory cell row 77, in some embodiments, the memory controller 26 may determine operational parameters of a memory array 64 or memory channel 62 that includes the currently activated memory cell row 77. For example, the operational parameters may indicate the column address of the memory cell column 78 currently being selected by the column select circuitry 68 for reading and/or writing. Additionally or alternatively, the operational parameters may indicate the row address of the memory cell row 77 currently being activated by the row select circuitry 66.

Thus, in some embodiments, the memory controller 26 may determine whether the target data block 29 is stored in a currently activated memory cell row 77 based at least in part on their associated row addresses. For example, the memory controller 26 may determine that the target data block 29 is stored in the currently activated memory cell row 77 when the row address associated with the target data block 29 matches the row address of the currently activated memory cell row 77. Additionally or alternatively, the memory controller 26 may determine whether the target data block 29 is stored in a currently activated memory cell row 77 by comparing the row address associated with the currently targeted data block 29 and the row address of the data block 29 targeted directly previous.

Furthermore, the memory controller 26 may determine whether the target data block 29 results in a memory-side cache miss (decision block 120). As described above, in some embodiments, the memory controller 26 may determine whether a data block 29 is stored in a cache based at least in part on a virtual memory address and/or a physical memory address associated with the data block 29. For example, based at least in part on its virtual memory address and physical memory address, the memory controller 26 may determine a target value of tag metadata 33 expected to be associated with the target data block 29.

By searching valid cache lines 23 included in the memory-side caches 24 based on the target tag metadata value, the memory controller 26 may determine whether the target data block 29 results in a memory-side cache miss. For example, when the target tag metadata value does not match the tag metadata 33 included in any of the cache lines 23 implemented in the memory-side caches 24, the memory controller 26 may determine that the target data block 29 results in a memory-side cache miss. On the other hand, when the tag metadata 33 is included in one or more cache lines 23 implemented in the memory-side caches 24, the memory controller 26 may determine that the target data block 29 results in a memory-side cache hit and, thus, does not result in a memory-side cache miss.

When it initially results in a memory-side cache miss, the memory controller 26 may determine whether caching (e.g., copying) of the activated memory cell row 77 in the memory-side caches 24 is complete (decision block 124). In some embodiments, the memory controller 26 may determine whether caching has been completed based at least in part on the column addresses of the memory cell columns 78 selected by the column select circuitry 68 while the memory cell row 77 is activated. Additionally or alternatively, the memory controller 26 may determine whether caching of the activated memory cell row 77 has been completed based at least in part on free (e.g., available) storage capacity in the cache line 23. For example, when line width of a cache line 23 is sized based on page width of a memory array 64, the memory controller 26 may determine that caching of the activated memory cell row 77 is complete when amount of free storage capacity remaining in the cache line 23 is less than or equal to a threshold.

When caching of the activated memory cell row 77 is not yet complete, in some embodiments, the memory controller 26 may periodically re-determine whether the target data block 29 results in a memory-side cache miss (arrow 130). For example, the memory controller 26 may re-determine whether the target data block 29 results in a memory-side cache miss after each time a data block 29 is cached in the cache line 23. At least in some instances, controlling data storage in this manner may facilitate improving (e.g., reducing) data retrieval latency and, thus, operational efficiency of the computing system, for example, by enabling the target data block 29 to being propagation to the processing circuitry before the activated memory cell row 77 is completely cached in the cache line 23.

To facilitate further reducing data retrieval latency, in some embodiments, the memory controller 26 may adaptively (e.g., dynamically) adjust caching order of data blocks 29 in the cache line 23. For example, when a third data block 29 also stored in the first memory cell row 77A is targeted after the first data block 29A is cached in the cache line 23, but before the second data block 29B is cached, the memory controller 26 may instruct the memory channel 62 to output the third data block 29 to the memory-side caches 24 before the second data block 29B. In other words, the cache line 23 may store the third data block 29 and associated local metadata 31 directly after the first data block 29A and the first local metadata 31A.

To facilitate reducing complexity of memory access timing and/or arbitration, in other embodiments, the memory controller 26 may instruct the memory channel 62 to systematically proceed down the activated memory cell row 77. In other words, in such embodiments, the memory controller 26 may wait until caching of the activated memory cell row 77 is complete (arrow 132) before re-determining whether the target data block 29 nevertheless results in a memory-side cache miss (decision block 126). When the target data block 29 nevertheless results in a memory-side cache miss, the memory controller 26 may indicate occurrence of a page fault to the computing system 10, for example, which may initiate retrieval of the target data block 29 from non-volatile memory, such as a hard disk drive (HDD) and/or a solid-state drive (SSD).

On the other hand, when the target data block 29 does not result in a memory-side cache miss, the memory controller 26 may instruct the memory-side caches 24 to output the target data block 29, for example, to one or more of the processor-side caches 22 via a coherency bus 20B (process block 122). In some embodiments, a memory-side cache 24 may output a cache line 23 with tag metadata 33 that matches the target tag metadata value expected to be associated with the target data block 29. When stored in a higher level cache (e.g., memory channel cache 80), in some embodiments, the target data block 29 may pass through one or more lower level caches (e.g., shared memory-side caches 82 and/or processor-side caches 22) before reaching the processing circuitry 16. In any case, in this manner, a memory controller 26 (e.g., memory-side memory controller 26B) may control data caching to facilitate providing target data blocks 29 via one or more memory-side caches 24.

After outputting the target data block 29, returning to the process 94 of FIG. 9, the memory controller 26 may update spatio-temporal data access information 84 associated with each data block 29 stored in the same memory cells row 77 as the target data block 29 to facilitate controlling subsequent data caching (process block 104). For example, after the Kth data block 29K is targeted, the memory controller 26 may update a last related access parameter associated with the Kth data block 29K to indicate when the Kth data block 29K was targeted. Additionally, the memory controller 26 may update the last related access parameters associated each of the data block 29 stored in the first memory cell row 77A. For example, the memory controller 26 may update a last related access parameter associated with the first data block 29A and a last related access parameter associated with the second data block 29B to indicate when the Kth data block 29K was targeted.

After the target data block 29 is received from the memory sub-system 14, returning to the process 46 of FIG. 5, the memory controller 26 may instruct the processor-side caches 22 to store the target data block 29 in a cache line 23 to facilitate improving future (e.g., subsequent) data retrieval speeds (process block 60). As described, in some embodiments, the memory controller 26 may control data storage in the processor-side caches 22 based at least in part on temporal data access information 34. For example, the memory controller 26 may predict whether other data blocks 29 currently stored in the processor-side caches 22 will be targeted during an (e.g., first) upcoming control horizon based at least on associated write time parameters, which indicate when the data blocks 29 were initially stored in the memory sub-system 14, associated last accessed parameters, which indicate when the data blocks 29 were most recently accessed (e.g., targeted), and/or access count parameters, which indicate the number of times the data blocks 29 have previously been accessed. To make room for the target data block 29, in some embodiments, the memory controller 26 may instruct the processor-side caches 22 to flush one or more cache lines 23 storing data blocks 29 not expected to be targeted during the upcoming control horizon. Additionally or alternatively, the memory controller 26 may instruct the processor-side caches 22 to flush a cache line 23 storing a data block 29 least recently targeted by the processing circuitry 16.

Comparatively, as described above, a memory controller 26 (e.g., memory-side memory controller 26B) may control data storage in the memory-side caches 24 based at least in on spatio-temporal data access information 84. For example, the memory controller 26 may predict whether other data blocks 29 currently stored in the memory-side caches 24 will be targeted during a second (e.g., longer) upcoming control horizon based at least in part on associated last related access parameters, which each indicate the most recent time a spatially related data block 29 was targeted. To make room for the target data block 29, in some embodiments, the memory controller 26 may instruct the memory-side caches 24 to flush one or more cache lines 23 storing data blocks 29 not expected to be targeted during the second (e.g., longer) upcoming control horizon.

Additionally or alternatively, the memory controller 26 may instruct the memory-side caches 24 to flush a cache line 23 storing a data block 29 spatially related (e.g., stored in same memory cell row 77) with a data block 29 least recently targeted by the processing circuitry 16. In other words, in some embodiments, the memory controller 26 may instruct the processor-side caches 22 to flush a cache line 23 storing data blocks 29 from a least recently targeted memory cell row 77. In any case, in some embodiments, associating cached data blocks 29 with local metadata 31 may facilitate improving flushing efficiency, for example, by reducing amount of data output to a higher cache level or a memory channel 62 during a flush operation.

Figure 12:
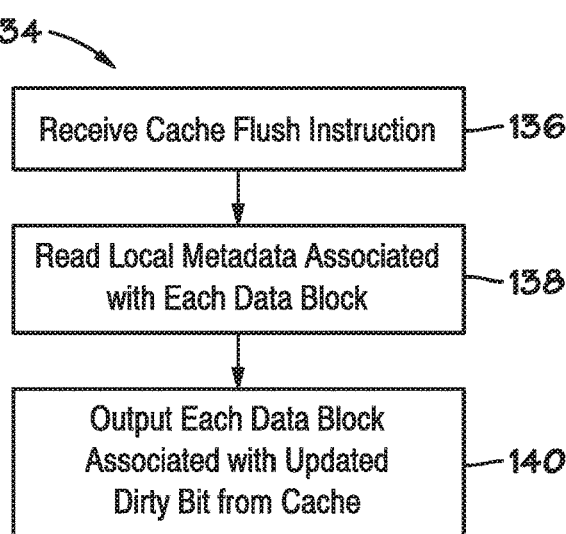
FIG. 12 is a flow diagram of an example process for flushing a cache line from the second cache of FIG. 10, in accordance with an embodiment of the present disclosure.

To help illustrate, an example of a process 134 for flushing a cache, such as a processor-side cache 22 or a memory-side cache 24, is described in FIG. 12. Generally, the process 134 includes determining a cache flush instruction (process block 136), reading local metadata associated with each data block stored in a cache line (process block 138), and outputting each dirty data block from the cache line (process block 140).

Although described in a particular order, which represents a particular embodiment, it should be noted that the process 134 may be performed in any suitable order. Additionally, embodiments of the process 134 may omit process blocks and/or include additional process blocks. Moreover, in some embodiments, the process 134 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., processor-side memory controller 26A or memory-side memory controller 26B) may instruct a cache (e.g., processor-side cache 22 or memory-side cache 24) to flush a cache line 23 (process block 136). Since a cache generally has limited storage capacity, as described above, a cache may flush a cache line 23 to make room for subsequently received (e.g., retrieved, input, or targeted) data blocks 29. Thus, in some embodiments, the memory controller 26 may instruct the cache to flush a cache line 23 when the used cache capacity reaches a threshold. Additionally or alternatively, the memory controller 26 may instruct the cache to flush a cache line 23 in response to receiving a data block 29 for caching.

As described above, in some embodiments, a memory controller 26 may select a cache line 23 to flush from a cache based at least in part on associated temporal data access information 34 and/or associated spatio-temporal data access information 84. For example, based at least in part on temporal data access information 34 and/or spatio-temporal data access information 84, the memory controller 26 may predict whether currently cached data blocks 29 will be targeted within an (e.g., first or send) upcoming control horizon and select a cache line 23 storing data blocks 29 not expected to be targeted during the upcoming control horizon for flushing. Additionally or alternatively, the memory controller 26 may select a cache line 23 storing a data block 29 least recently targeted by the processing circuitry 16 for flushing. Furthermore, in some embodiments, the memory controller 26 may select a cache line 23 storing a data block 29 spatially related (e.g., stored in same memory cell row 77) with a data block 29 least recently targeted by the processing circuitry 16 for flushing.

In any case, after identifying a cache line 23 for flushing, the memory controller 26 may read the local metadata 31 associated with each data block 29 stored in the cache line 23 (process block 138). In other words, in some embodiments, the memory controller 26 may read the local metadata 31 stored in cache lines 23 before flushing. As described above, in some embodiments, the local metadata 31 associated with a data block 29 may include dirty metadata 37, which indicates whether the data block 29 is dirty or otherwise modified after initially being stored in the cache line 23. For example, when the first cache line 23B of FIG. 10 is selected for flushing, the memory controller 26 may read the Kth dirty metadata 37K to determine whether the Kth data block 29K is dirty, the first dirty metadata 37A to determine whether the first data block 29A is dirty, and so on.

As described above, in some embodiments, dirty metadata 37 may include a dirty bit, which indicates that an associated data block 29 is dirty (e.g., modified) when set (e.g., "1" bit) and that the associated data block 29 is not dirty (e.g., unmodified) when not set (e.g., "0" bit). For example, the memory controller 26 may determine that the Kth data block 29K is dirty when the Kth dirty metadata 37K is set. Additionally, the memory controller 26 may determine that the first data block 29A is not dirty when the first dirty metadata 37A is not set.

Returning to the process 134 of FIG. 12, to facilitate improving flushing efficiency, the memory controller 26 may instruct the cache to output each dirty data block 29, for example, without outputting unmodified (e.g., non-dirty) data blocks 29 (process block 140). As an illustrative example, when Kth dirty metadata 37K indicates that the Kth data block 29K is dirty and the first dirty metadata 37A indicates that the first data block 29A is not dirty, the memory controller 26 may instruct the cache to output the Kth data block 29K without outputting the first data block 29A, thereby reducing amount of data and, thus, communication bandwidth and/or electrical power used to flush the cache line 23.

In some embodiments, the memory controller 26 may instruct the cache to flush the cache line 23 by outputting the dirty data blocks 29 to a higher cache level, for example, via a coherency bus 20B. Additionally or alternatively, the memory controller 26 may instruct the cache to flush the cache line 23 by outputting the dirty data blocks 29 to a memory channel 62 and/or to non-volatile memory, such as a hard disk drive (HDD) and/or a solid-state drive (SSD). In any case, in this manner, a memory controller 26 may control caching of data block 29 to make room for storage of subsequently targeted data blocks 29.

Returning to the process 46 of FIG. 5, after the target data block 29 is stored in the processor-side caches 22, the memory controller 26 may instruct the processor-side caches 22 to supply the target data block 29 to the processing circuitry 16 (process block 52). In some embodiments, a processor-side caches 22 may output a cache line 23 with tag metadata 33 that matches the target tag metadata value expected to be associated with the target data block 29. When stored in a higher level cache (e.g., shared processor-side cache 32), in some embodiments, the target data block 29 may pass through one or more lower level caches (e.g., private processor-side caches 30) before reaching the processing circuitry 16.

To facilitate controlling subsequent data caching, after a data block 29 is targeted, the memory controller 26 may update temporal data access information 34 associated with the data block 29 (process block 54). For example, after the Kth data block 29K is targeted, the memory controller 26 may update a last related access parameter associated with the Kth data block 29K to indicate when the Kth data block 29K was targeted. Additionally or alternatively, the memory controller 26 may increment an access count parameter associated with the Kth data block 29K.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computing system comprising a memory sub-system, wherein the memory sub-system comprises:
   one or more memory devices configured to be communicatively coupled to processing circuitry via one or more data buses, wherein the one or more memory devices comprise a first plurality of memory cells organized to form a first memory array corresponding with a first memory channel;
   hierarchical memory caches coupled between the first memory array and the one or more data buses; and
   a memory-side memory controller communicatively coupled to the first memory channel and the hierarchical memory caches, wherein the memory-side memory controller is configured to control caching in the hierarchical memory caches of first data blocks stored in the first memory array of the first memory channel based at least in part on a first spatio-temporal relationship between first storage locations of the first data blocks in the first memory array based on spatio-temporal access information, wherein the spatio-temporal access information comprises a block identifier, a related block identifier, a related last access parameter, or any combination thereof.

2. The computing system of claim 1, comprising a processing sub-system communicatively coupled to the memory sub-system via the one or more data buses, wherein the processing sub-system comprises:
   the processing circuitry, wherein the processing circuitry is configured to perform an operation based on a target data block;
   hierarchical processor caches coupled between the processing circuitry and the one or more data buses; and
   a processor-side memory controller communicatively coupled to the processing circuitry, the hierarchical processor caches, and the memory-side memory controller, wherein the processor-side memory controller is configured to control caching in the hierarchical memory caches of the first data blocks stored in the first memory array based at least in part on a temporal relationship between previous targeting of the first data blocks by the processing circuitry.

3. The computing system of claim 1, wherein:
   the memory sub-system comprises a second memory channel configured to store second data blocks in a second memory array; and
   the hierarchical memory caches comprise:
      a first memory channel cache configured to cache one or more of the first data blocks stored in the first memory channel;
      a second memory channel cache configured to cache one or more of the second data blocks stored in the second memory channel; and
      a shared memory cache coupled to the first memory channel cache and the second memory channel cache to provide the first memory channel cache and the second memory channel cache a lower cache level.

4. The computing system of claim 1, wherein the hierarchical memory caches are configured to implement a cache line with a line width that is greater than or equal to an integer multiple of a size of a data block expected to be targeted by the processing circuitry.

5. The computing system of claim 1, wherein the memory-side memory controller is configured to:
   determine characteristics of an application running on the computing system that resulted in the processing circuitry requesting a target data block; and
   adaptively instruct the hierarchical memory caches to adjust line width of a cache line based at least in part on the characteristics of the application running on the computing system.

6. The computing system of claim 1, wherein:
   the one or more memory devices comprise a second plurality of memory cells configured to be organized into a second memory array corresponding with a second memory channel; and
   the memory-side memory controller is configured to control caching in the hierarchical memory caches of second data blocks stored in the second memory array of the second memory channel based at least in part on a second spatio-temporal relationship between second storage locations of the second data blocks in the second memory array.

7. The computing system of claim 1, wherein the memory-side memory controller is configured to:
   receive a memory access request from a processor-side memory controller that identifies a first data block targeted by the processing circuitry;
   determine a row address and a column address that identifies storage location of the first data block in the first memory array of the first memory channel based at least in part on the memory access request; and
   when the first data block results in a memory-side cache miss:
      instruct the first memory channel to activate a memory cell row of the first memory array identified by the row address;
      instruct the first memory channel to select a first memory cell column of the first memory array identified by the column address to cache the first data block in the hierarchical memory caches;
      instruct the hierarchical memory caches to output a cache line with the first data block to the one or more data buses; and
      after the cache line is output with the first data block, instruct the first memory channel to select a second memory cell column of the first memory array to cache a second data block stored in the memory cell row identified by the row address along with the first data block in the cache line.

8. An apparatus comprising:
   processing circuitry configured to perform a first operation based at least in part on a first target data block;
   a processor-side cache, wherein the processor-side cache is communicatively coupled to the processing circuitry configured to implement a first cache line;
   a memory sub-system, wherein the memory sub-system comprises:
      a memory-side cache coupled to the processor-side cache via a data bus, wherein the memory-side cache comprises a first memory channel cache and is configured to implement a second cache line;

a memory device comprising a plurality of memory channels;
a memory channel of the plurality of memory channels, wherein the memory channel comprises a memory array; and
one or more memory controllers configured to, when a first target data block of the memory array results in a memory-side cache miss:
  determine a first row address that identifies a first memory cell row of the memory array as storing the first target data block, wherein the first memory cell row is configured to store a first plurality of data blocks;
  instruct the memory array to successively output the first plurality of data blocks from the first memory cell row to the memory-side cache to store each of the first plurality of data blocks in the second cache line; and
  instruct the memory-side cache to output the first target data block to the processing circuitry to enable the processing circuitry to perform the first operation based at least in part on the first data block.

9. The apparatus of claim 8, wherein the one or more memory controllers are configured to:
  determine first spatio-temporal data access information associated with the first plurality of data blocks stored in the first memory cell of the memory array and in the second cache line of the memory-side cache, wherein the first spatio-temporal data access information indicates when any of the first plurality of data blocks was most recently targeted by the processing circuitry, number of times any of the first plurality of data blocks have previously been targeted by the processing circuitry, or both; and
  control data storage in the memory-side cache based at least in part on the first spatio-temporal data access information.

10. The apparatus of claim 9, wherein:
the processor-side cache is configured to:
  store the first target data block in the first cache line;
  implement a third cache line having a line width equal to a first line width of the first cache line, wherein the first line width is less than a second line width of the second cache line; and
  store another data block in the third cache line; and
the one or more controllers are configured to:
  determine first temporal data access information associated with the first target data block stored in the memory array and in the first cache line of the processor-side cache, wherein first temporal data access information indicates parameters associated with a previous attempt by the processing circuitry to access the first target data block;
  determine second temporal data access information associated with the other data block stored in the third cache line of the processor-side cache, wherein the second temporal data access information indicates parameters associated with another previous attempt by the processing circuitry to access the other data block;
  instruct the processor-side cache to flush the first cache line when the first temporal data access information and the second temporal data access indicate that the previous attempt to access the other data block is more recent than the previous attempt to access the first target data block; and
  instruct the processor-side cache to flush the third cache line when the first temporal data access information and the second temporal data access information indicate that the previous attempt to access the first target data block is more recent that the previous attempt to access the other data block.

11. The apparatus of claim 9, wherein:
a second memory cell row of the memory array is configured to store a second plurality of data blocks;
the memory-side cache comprises a third cache line configured to store each of the second plurality of data blocks; and
the one or more controllers are configured to:
  determine second spatio-temporal data access information associated with the second plurality of data blocks stored in the second memory cell row of the memory array and in the third cache line of the memory-side cache, wherein the second spatio-temporal data access information indicates when any of the second plurality of data blocks was most recently targeted by the processing circuitry, the number of times any of the second plurality of data blocks have previously been targeted by the processing circuitry, or both.

12. The apparatus of claim 9, wherein the one or more memory controllers are configured to update the first spatio-temporal data access information after each time the processing circuitry targets any of the first plurality of data blocks.

13. The apparatus of claim 8, wherein the memory-side cache is configured to:
  store the first target data block in the second cache line before any other data blocks of the first plurality of data blocks; and
  successively store each of the other data blocks of the first plurality of data blocks in the second cache line after the first target data block.

14. The apparatus of claim 13, wherein the memory-side cache is configured to:
  output the second cache line including the first target data block to the memory channel before one or more of the other data blocks of the first plurality of data blocks is stored in the second cache line; and
  successively store one or more of the other data block of the first plurality of data blocks while the processing circuitry is performing the first operation based at least in part on the first target data block.

15. The apparatus of claim 8, wherein:
the processing circuitry is configured to perform a second operation after the first operation based at least in part on a second target data block that is stored in the first memory cell row of the memory array along with the first target data block; and
the one or more memory controllers are configured to:
  determine whether the second target data block is already stored in the second cache line of the memory-side cache, and
  instruct the memory-side cache to output the second cache line to the data bus after the second target data block is stored in the second cache line to enable the processing circuitry to perform the second operation based at least in part on the second target data block.

16. The apparatus of claim 8, wherein, when the first target data block results in the memory-side cache miss, the one or more memory controllers are configured to:
  determine a first column address that identifies a first memory cell column that intersects the first memory cell row as storing the first target data block, wherein a second column address identifies a second memory cell column of the memory array that intersects the first memory cell row and stores another data block of the first plurality of data blocks;

instruct the memory array to output the first target data block by activating the first memory cell row based at least in part on the first row address and selecting the first memory cell column based at least in part on the first column address; and instruct the memory array to output the other data block of the first plurality of data blocks by selecting the second memory cell column after the first memory cell column based at least in part on the second column address without deactivating the first memory cell row between selection of the first memory cell column and selection of the second memory cell column.

17. A method for controlling data storage in hierarchical caches implemented between a memory channel and processing circuitry, comprising:

determining a row address and a column address that indicate storage location in a memory array corresponding to a memory channel of a first data block targeted by the processing circuitry;

outputting a signal from row select circuitry to a word line coupled to a first memory cell row of the memory array identified by the row address;

outputting a first column select signal to column select circuitry to enable the memory array to output the first data block from the first memory cell row to a first cache of the hierarchical caches via a first plurality of bit lines each coupled to a first memory cell column of the memory array identified by the column address;

outputting a first cache line comprising the first data block from the first cache to enable the processing circuitry to perform an operation based at least in part on the first data block; and outputting a second column select signal to the column select circuitry to enable the memory array to output a second data block from the first memory cell row to the first cache via a second plurality of bit lines each coupled to a second memory cell column different from the first memory cell column while the processing circuitry is performing the operation based at least in part on the first data block.

18. The method of claim 17, wherein:

outputting the first cache line from the first cache comprises outputting the first cache line from the first cache before the second data block is stored in the first cache line; and outputting the second column select signal comprises outputting the second column select signal to the column select circuitry after the first cache outputs the first cache line.

19. The method of claim 17, wherein outputting the first cache line from the first cache comprises outputting the first cache line from the first cache to a second cache of the hierarchical caches, wherein:

the first cache line is implemented in the first cache with a first cache line width; and a second cache line is implemented in the second cache with a second cache line width smaller than the first cache line width.

20. The method of claim 17, comprising:

determining first spatio-temporal data access information associated with a first plurality of data blocks previously cached in the first cache line of the first cache, wherein each of the first plurality of data blocks is stored in a second memory cell row of the memory array and the first spatio-temporal data access information indicates a first most recent time any of the first plurality of data blocks was previously targeted by the processing circuitry; and determining second spatio-temporal data access information associated with a second plurality of data blocks previously cached in a second cache line of the first cache, wherein each of the second plurality of data blocks is stored in a third memory cell row of the memory array and the second spatio-temporal data access information indicates a second most recent time any of the second plurality of data blocks was previously targeted by the processing circuitry.

* * * * *